United States Patent
Ervine

(10) Patent No.: US 9,729,590 B2
(45) Date of Patent: Aug. 8, 2017

(54) DIGITAL COMMUNICATION AND MONITORING SYSTEM AND METHOD DESIGNED FOR SCHOOL COMMUNITIES

(71) Applicant: Jeff Ervine, New York, NY (US)

(72) Inventor: Jeff Ervine, New York, NY (US)

(73) Assignee: BRIDG-IT LLC, New York, NY (US)

( * ) Notice: Subject to any disclaimer, the term of this patent is extended or adjusted under 35 U.S.C. 154(b) by 100 days.

(21) Appl. No.: 14/120,337

(22) Filed: May 14, 2014

(65) Prior Publication Data
US 2014/0280584 A1 Sep. 18, 2014

Related U.S. Application Data

(63) Continuation-in-part of application No. 13/921,628, filed on Jun. 19, 2013.

(60) Provisional application No. 61/661,568, filed on Jun. 19, 2012, provisional application No. 61/823,234, filed on May 14, 2013.

(51) Int. Cl.
*H04L 29/06* (2006.01)
*H04L 29/08* (2006.01)

(52) U.S. Cl.
CPC ........ *H04L 65/403* (2013.01); *H04L 63/1441* (2013.01); *H04L 67/02* (2013.01)

(58) Field of Classification Search
CPC .......................... H04L 65/403; G06Q 10/1095
USPC ....... 709/203, 204, 205, 223, 224; 705/7.11, 705/7.31, 7.29, 7.13, 7.15, 7.26
See application file for complete search history.

(56) References Cited

U.S. PATENT DOCUMENTS

| | | | | |
|---|---|---|---|---|
| 7,529,689 B2 * | 5/2009 | Rowan | ................... | G06Q 30/06 705/26.1 |
| 2002/0174429 A1 * | 11/2002 | Gutta | ................. | H04N 5/44543 725/46 |
| 2004/0230495 A1 * | 11/2004 | Lotvin | ................... | G06Q 30/02 705/26.1 |
| 2009/0313225 A1 * | 12/2009 | Nordlinger | ............ | G06Q 10/10 |
| 2011/0016056 A1 * | 1/2011 | Hargroder | .............. | G06Q 10/10 705/325 |
| 2012/0035977 A1 * | 2/2012 | Wells | ..................... | G06Q 10/10 705/7.29 |

(Continued)

OTHER PUBLICATIONS

"Online Grievance Redressal System"—IBM, Dec. 2012 https://www.ibm.com/developerworks/community/wikis/form/anonymous/api/wiki/336d1dbb-5203-4eb3-8542-f4a2d1af056c/page/51cecec3-c006-490b-8867-cc09a0f347f9/attachment/48aa24ab-f7b2-4e5d-9081-9de3ca527577/media/online%20grievience%20redressal%20system.pdf.*

*Primary Examiner* — Randy Scott
(74) *Attorney, Agent, or Firm* — Liang, Frank & King LLP; Brian Hennessey

(57) ABSTRACT

A method related to addressing possible damage caused by inappropriate internet conduct, including writings, pictures, videos, or any other web-delivered content, and/or inappropriate behavior and/or conduct, is provided. The method includes providing a reporting interface enabling a reporting user to generate a complaint report regarding an unfavorable item published by one or more third parties. The method further includes receiving the complaint report and alerting an administrator regarding the complaint report. Additionally, the method includes providing an administrator interface enabling the administrator to view the complaint report, submit the complaint report to an authority, and assign a complaint report status to the complaint report. A resource (Continued)

center is provided for administrators and users and includes content curated for the recipient.

25 Claims, 24 Drawing Sheets

(56) References Cited

U.S. PATENT DOCUMENTS

2013/0138536 A1* 5/2013 Koh ................. G06Q 30/06
705/26.81

* cited by examiner

300

310 — Victim Progress
- ☐ 3rd Degree Attack Determined
- ☐ Emailed Strongly Worded Letter
- ☐ Elected Expedited Pre-arbitration Review
- ☐ Emailed 2nd removal request - B4 Review
- ☐ Case Approved for IPA Arbitration
- ☐ Final Email removal request - After Review
- ☐ Elected IPA Arbitration
- ☐ Digital Complaint Form filled out w/ attachments
- ☐ Email Notification of IPA Arbitration start
- ☐ Victim Responds to Publishers initial response

320 — Victim Progress
- ☐ Publisher Unknown
- ☐ Responded to the Strongly Worded Letter
- ☐ Publisher Agrees to remove posting
- ☐ Responded 2nd removal request - Pre-arb
- ☐ Responded to final removal request - Pre-arb
- ☐ Publisher provides initial response to the Alleged Victim
- ☐ Publisher puts in his final Response to Victim

330
- ☐ Arbitrator appointed and review in process
- ☐ Decision Announced and Athena QR Certificate given

FIG. 3

DPA DIGITAL PROTECTION AUTHORITY

How it Works | Enter A Case | Watch & Learn | Supporters | About | Contact Us | Home Case #CB2013-2934

VIEW EVIDENCE

[NOTIFICATIONS] [VIEW EVIDENCE] ["REMOVE IT" AGREEMENT] [MY PROFILE] [CASE DETAILS]

---

VIEW EVIDENCE

| Uploaded by: | Published: | Type: | Location Found: |
|---|---|---|---|
| Clifford Peach (victim) | 3/19/2013 | Image | Facebook |
| Clifford Peach (victim) | 3/19/2013 | Image | Twitter |
| Clifford Peach (victim) | 3/19/2013 | Image | Facebook, Twitter, tumblr, MySpace, MTV.com |

View/Download:
screenshot01.jpg
screenshot02.jpg
screenshot03.jpg

[ADD EVIDENCE]

[ADD COMMENTS]

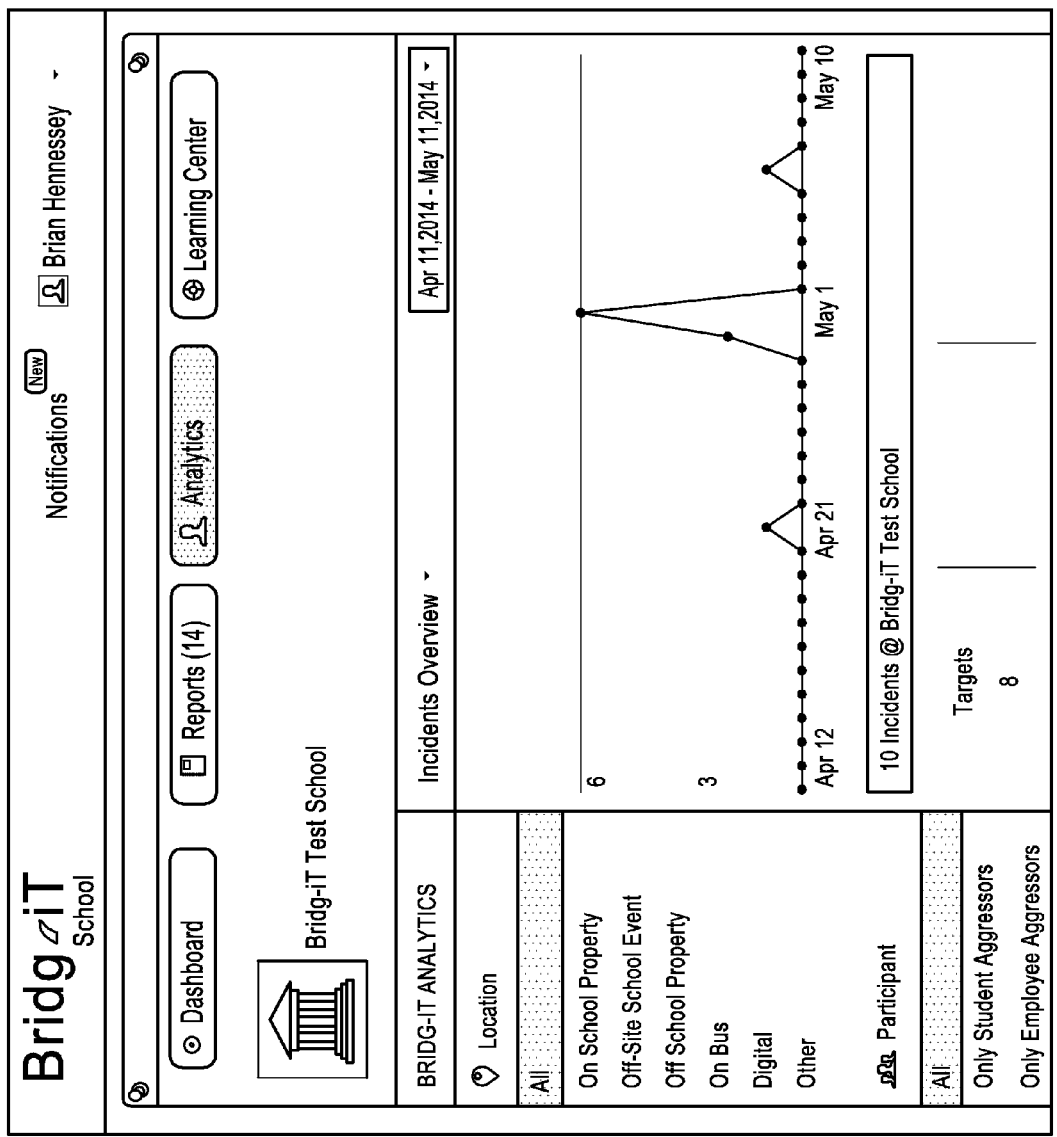
FIG. 11/1

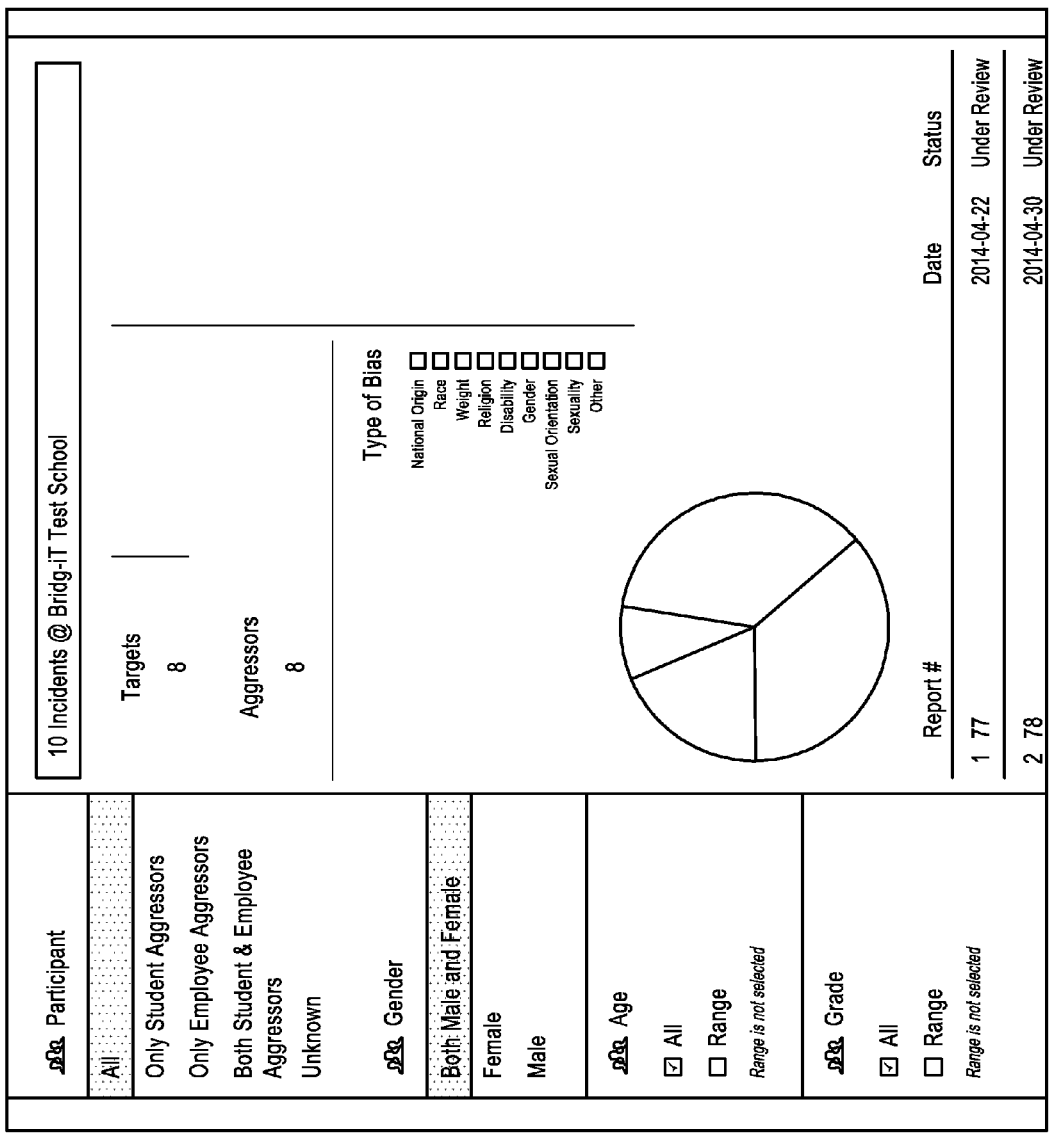
FIG. 11/2

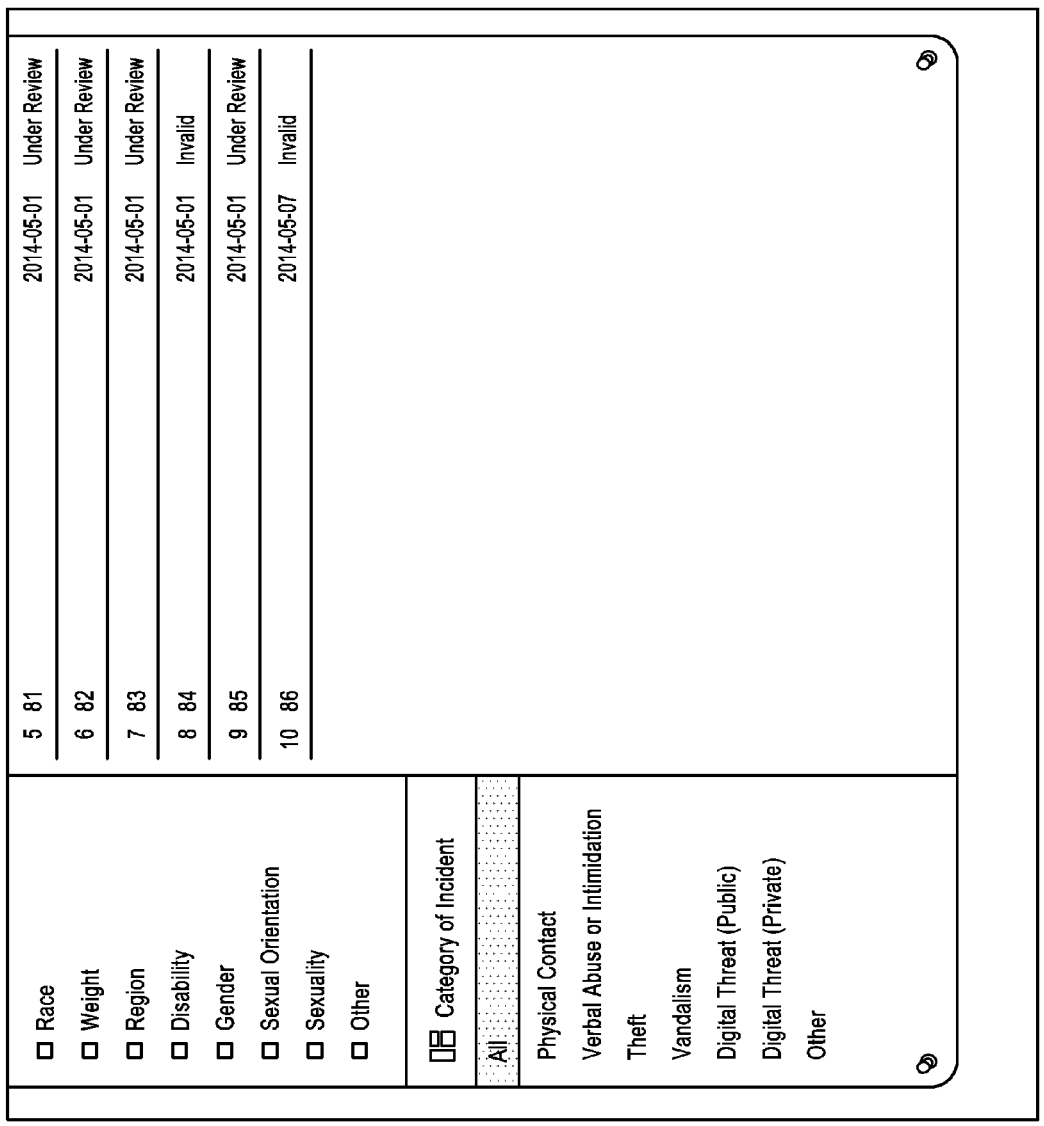
FIG. 11/3

1200

Where it Happened?: (Select all that apply)

☐ On School Property  ☐ Off-Site School Event  ☐ Off School Property  ☐ On Bus

☐ Online/Digital

*other (please specify)*

Is anyone involved an immediate danger to themselves or others?:

No    Yes

Was it about any of the following issues?: (Select all that apply)

☐ National Origin  ☐ Race  ☐ Weight  ☐ Disability  ☐ Religion  ☐ Gender

☐ Sexual Orientation  ☐ Sexuality

*other (please specify)*

☐ None of the above

FIG. 12B

Attach Evidence:
Please attach any texts, posts, sites, links, pictures or video, etc, that back up your report. All evidence is confidential, secure, and will only be viewed by the school moderator. It will not be redistributed to anyone.

LINKS/URLS | IMAGES/SCREENSHOTS/EMAILS/FILES

Web Address 1: [          ]  Select file: [ Add File ]

+ add more

You have not added any files, yet.
Click on the "Add File" button above to select files which you would like to upload or you can also drag-and-drop files right into this area Details:

*Describe what happened...*

*Do you know why?*

*Solution ideas?*

I, [          ], confirm that I have read and agreed with the Terms and Conditions and Code of Conduct

[ Submit ]

| Report Permissions | View Report | Add Notes | View Notes | View Evidence | Send Notification |
|---|---|---|---|---|---|
| Principal<br>Last Notified: Never | ✓ | ✓ | ✓ | ✓ | ☐ |
| Guidance<br>Last Notified: Never | ☐ | ☐ | ☐ | ☐ | ☐ |
| Security<br>Last Notified: Never | ☐ | ☐ | ☐ | ☐ | ☐ |
| Teacher<br>Last Notified: Never | ☐ | ☒ | ☐ | ☐ | ☐ |
| Billyray Cyrus<br>Parent of Miley Cyrus<br>2014-05-14 13:42:40 +0000 | ☒ | ☐ | ☐ | ☐ | ☐ |
| Tish Cyrus<br>Parent of Miley Cyrus<br>Last Notified: Never | ☐ | ☐ | ☐ | ☐ | ☐ |
| Jeff Timberlake<br>Parent of Justin Timberlake<br>Last Notified: Never | ☐ | ☐ | ☐ | ☐ | ☐ |
| Barbara Timberlake<br>Parent of Justin Timberlake<br>Last Notified: Never | ☐ | ☐ | ☐ | ☐ | ☐ |
| Jeff Kardashian<br>Parent of Kim Kardashian<br>Last Notified: Never | ☒ | ☐ | ☐ | ☐ | ☐ |
| Barbara Kardashian<br>Parent of Kim Kardashian<br>Last Notified: Never | ☐ | ☒ | ☐ | ☒ | ☐ |

[Add New Person]　　　　　　　　　　　　　　　　　　　　　　[Update]

≡ Report Notes

DIGITAL COMMUNICATION AND MONITORING SYSTEM AND METHOD DESIGNED FOR SCHOOL COMMUNITIES

CROSS-REFERENCE TO RELATED APPLICATIONS

This application is a Continuation-in-Part of U.S. application Ser. No. 13/921,628, filed on Jun. 19, 2013, entitled "Secure Digital Remediation Systems and Methods for Managing an Online Reputation," which claims benefit of U.S. Provisional Application Ser. No. 61/661,568, filed on Jun. 19, 2012, entitled "Internet Protection Act Online Dispute Resolution System and Method," which are incorporated herein by reference in their entirety for all purposes. This application also claims benefit of U.S. Provisional Application Ser. No. 61/823,234, filed on May 14, 2013, entitled "Digital Communication and Monitoring System and Method Designed for School Communities," which is incorporated herein by reference in its entirety for all purposes.

TECHNICAL FIELD

The present disclosure relates to data processing. More particularly, the present disclosure relates to addressing possible damage caused by inappropriate internet conduct, including writings, pictures, videos, or any other web-delivered content, or inappropriate physical conduct.

BACKGROUND

The Internet is used on regular basis by many people around the world. Usage of the Internet has been driven to higher levels by the likes of major search engines such as Google™ and Yahoo!™. This usage has been driven to even higher levels by the advent of social networking sites, such as Facebook™ and Myspace™, as well as personal blogging sites such as Wordpress™ based sites, and microblogging services such as Twitter™ and Tumblr™. Global users of the Internet post information and content daily to social networking and blogging sites, and other users of the Internet can find the posted information using search engines. As the Internet grows, social media grows as well. No longer bounded by distance and geography, users of the Internet are free to immediately communicate with anyone, anywhere, and at any time. However, with the benefit of almost instantaneous communications come dangers.

Almost all content that is published online, be it a letter to a friend, a photo shared on a social networking site, or a video published and then linked in a blog post, is immortalized online. Due to the lack of any supervision or censorship, there is nothing to prevent publication of unfavorable, damaging, threatening, or defamatory content. Unfavorable information published online can be quite damaging to a person. Unfavorable personal information, rumors, and outright lies can have real and serious impacts on a victim, especially when the victim is a minor.

Even though bullying and verbal attacks are not new, digital tools available today to bully and attack are. In the United States, approximately 160,000 students miss school every day due to the fear of some form of harassment. About 60% of Lesbian, Gay, Bisexual, and Transgender (LGBT) students who have been harassed or assaulted in school have not reported the incident. Approximately 282,000 students are physically attacked in secondary schools each month. Negative content can be digitally broadcast through the use of social media, reaching a much greater audience faster, resulting in a more harmful impact. Research has found that harassment and conflict that begins online often results in a physical altercation in school, with teachers not being aware what precipitated the conflict. Defamatory content, words and images can stay online permanently, impacting victims their entire lives.

Digital attacks have reached epidemic numbers while the number of solutions has remained very small. Additionally, any laws and policies remain useless due to the lack of a mechanism by which they can be consistently enforced. Removing unfavorable content from the Internet has proved to be a daunting task.

SUMMARY

According to example embodiments, the present technology provides systems and methods for addressing possible long-term and extensive damage caused by inappropriate internet conduct, including writings, pictures, videos, or any other web-delivered content, or inappropriate physical conduct.

According to various example embodiments, a method is provided. The method can be implemented by means of a computing device comprising one or more processors and a memory. The method can include providing a reporting interface enabling a reporting user to generate a complaint report regarding an unfavorable item published by one or more third parties, receiving the complaint report, alerting an administrator regarding the complaint report, and providing an administrator interface enabling the administrator to view the complaint report, submit the complaint report to an authority, and assign a complaint report status to the complaint report. The complaint report status can indicate the report is under review, invalid or closed. The method may further include encrypting sensitive information in the complaint report, alerting one or more additional parties associated with the complaint report, and/or receiving and archiving the unfavorable item.

In certain embodiments, the administrator interface further enables the administrator to identify one or more third parties and associate the one or more third parties with the complaint report, individually assign permissions to view and/or edit the complaint report to the one or more third parties, individually select the one or more third parties for delivering notifications associated with the complaint report, write notes associated with the complaint report, view action logs associated with the complaint report, create and send personal messages to the reporting user and/or the authority, and/or view statistical information associated with a plurality of complaint reports. In some embodiments, the administrator interface may be configured to highlight at least one new complaint report and/or sort multiple complaint reports.

In certain embodiments, the administrator interface further enables the administrator to assign a category to one or more hyperlinks associated with the unfavorable item. The category may include an explicit category, a restricted category, and an open category.

In certain embodiments, the complaint report can comprise data associated with a description of an incident, data associated with a reporting user name and one or more aggressor names, one or more hyperlinks associated with the unfavorable item, data related to a bias type, category of an incident, and a location of the incident. The unfavorable item can include at least one of a picture, a video segment, a text segment, and an audio segment.

In certain embodiments, the reporting interface may further enable the reporting user to assign a bias type, assign a category of an incident, identify a location of the incident, add one or more hyperlinks associated with the unfavorable item, upload files (for example, JPEGs and PDFs) identify one or more aggressor names, and provide written notes associated with the unfavorable item.

In certain embodiments, the method may further comprise scoring the unfavorable item on a severity scale based on at least one of data associated with the complaint report, a bias type, a category of an incident, a location of the incident, an aggressor name, responses to queries, and a rule set to produce a severity score, the rule set including instructions for responding to the complaint report based on the severity score. The method can further comprise dynamically modifying the rule set based on outcome evaluations of prior complaint reports, the outcome evaluations of prior complaint reports being generated automatically. In yet further embodiments, the method can comprise providing, through an administrator interface, recommendations based at least in part on the complaint report.

According to various example embodiments, a system is provided. The system can comprise a reporting interface configured to enable a reporting user to generate a complaint report concerning an unfavorable item published by one or more third parties. The system can also include a communication module configured to receive the complaint report and alert an administrator to the complaint report. The system can also include an administrator interface configured to enable the administrator to view the complaint report, submit the complaint report to an authority, and assign a complaint report status to the complaint report.

According to yet another aspect of embodiments of the present disclosure, a non-transitory processor-readable medium having instructions stored thereon is provided. The instructions, when executed by one or more processors, can cause the one or more processors to implement a method comprising providing a reporting interface enabling a reporting user to generate a complaint report regarding an unfavorable item published by one or more third parties, receiving the complaint report, alerting an administrator regarding the complaint report, and providing an administrator interface enabling the administrator to view the complaint report, submit the complaint report to an authority, and assign a complaint report status to the complaint report.

In further example embodiments and aspects, modules, systems, subsystems, or devices can be adapted to perform the recited method steps. Other features and example embodiments are described below.

BRIEF DESCRIPTION OF THE DRAWINGS

FIG. 3 is a screenshot of a progress chart illustrating an example method.

FIG. 6 is a screenshot of an online computer system according to an example embodiment.

FIG. 10 is a screenshot of a reports graphical interface.

FIG. 11 are screenshots of an analytics graphical interface.

FIGS. 12A-12C are screenshots of a new complaint report interface.

FIGS. 13A-13D are screenshots of a selected complaint report interface.

Figure 14B:
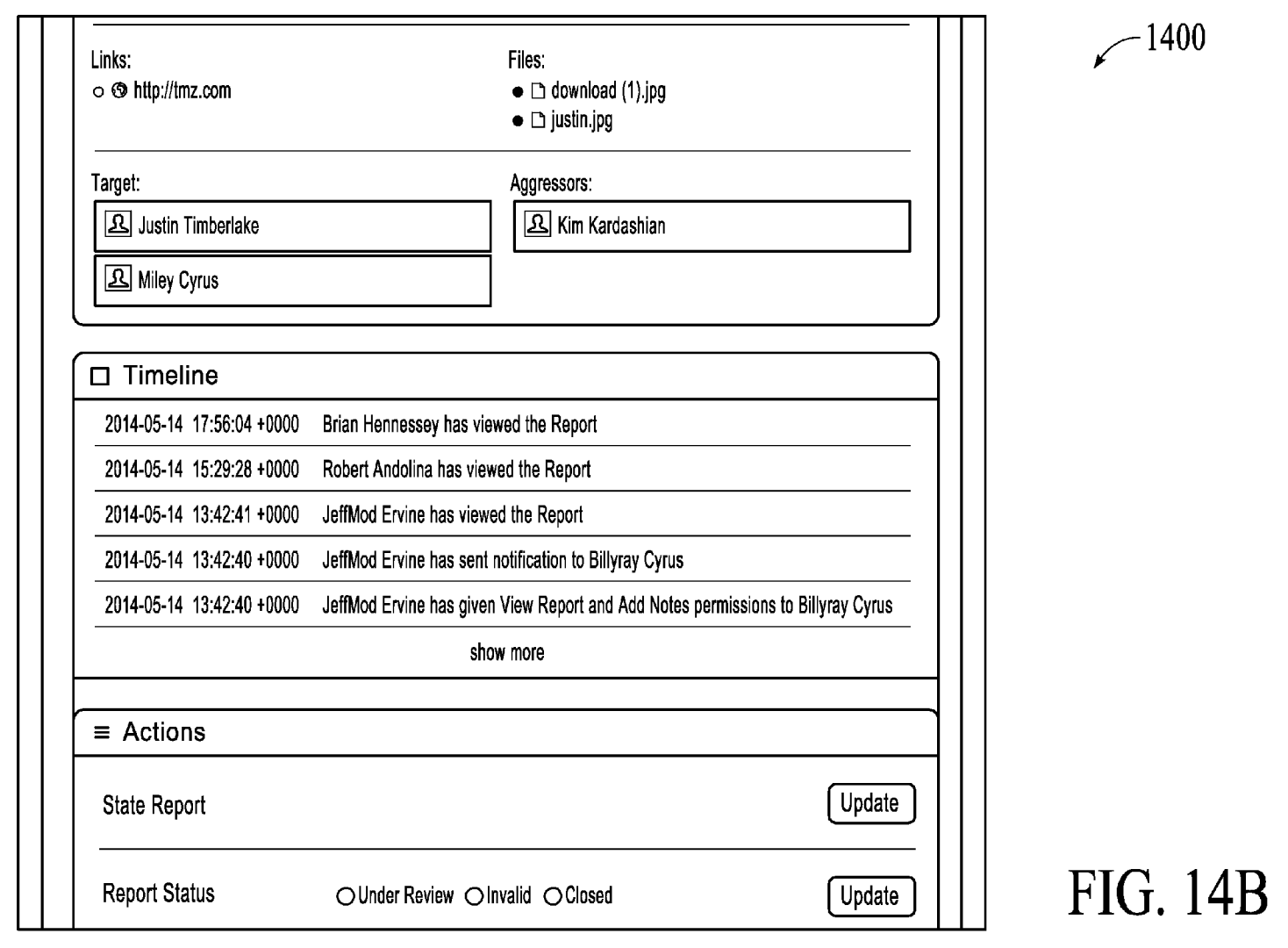
Figure 14D:
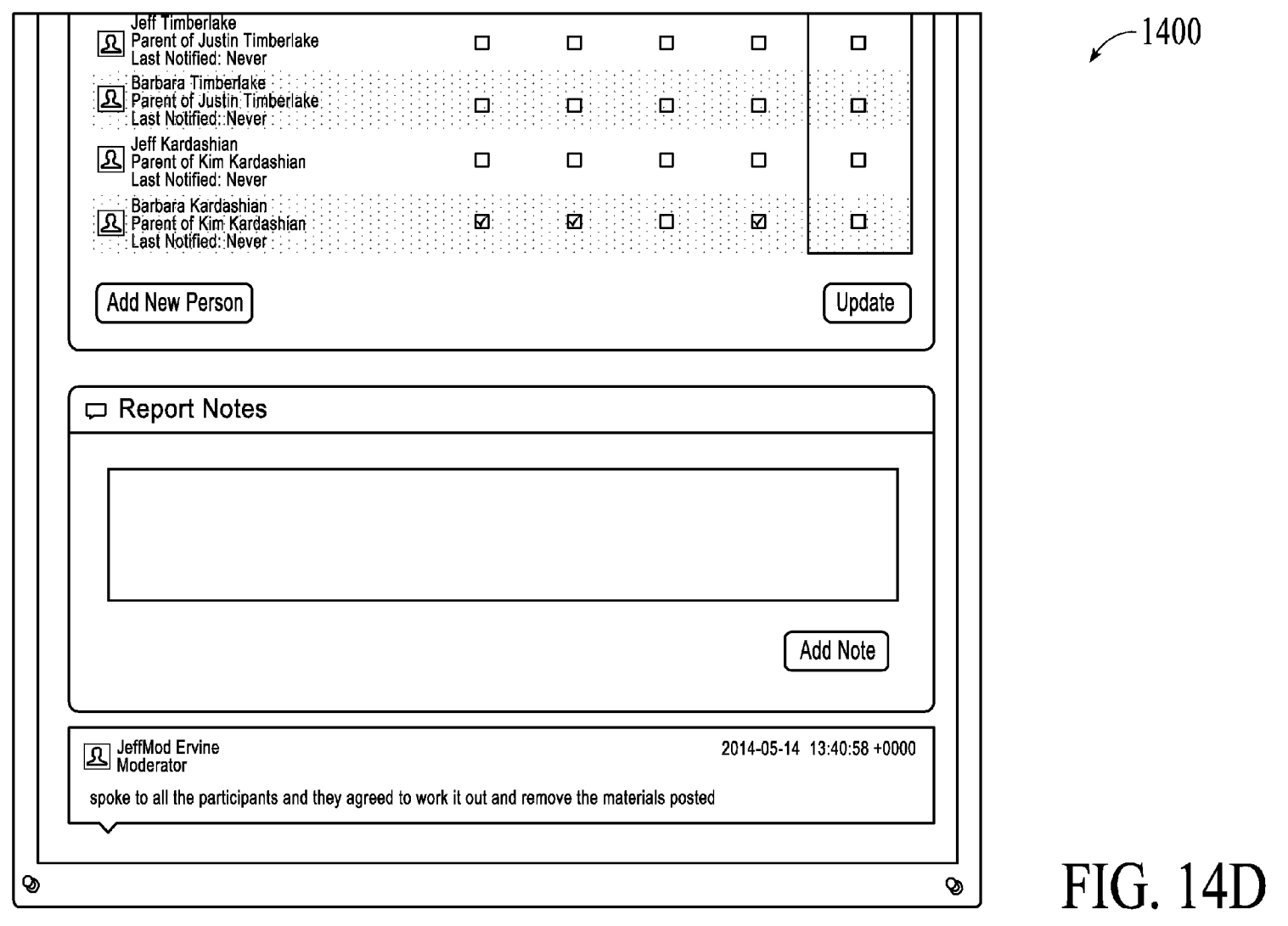

FIGS. 14A-14D are screenshots of a selected state report interface.

DETAILED DESCRIPTION OF EXAMPLE EMBODIMENTS

Figure 1:
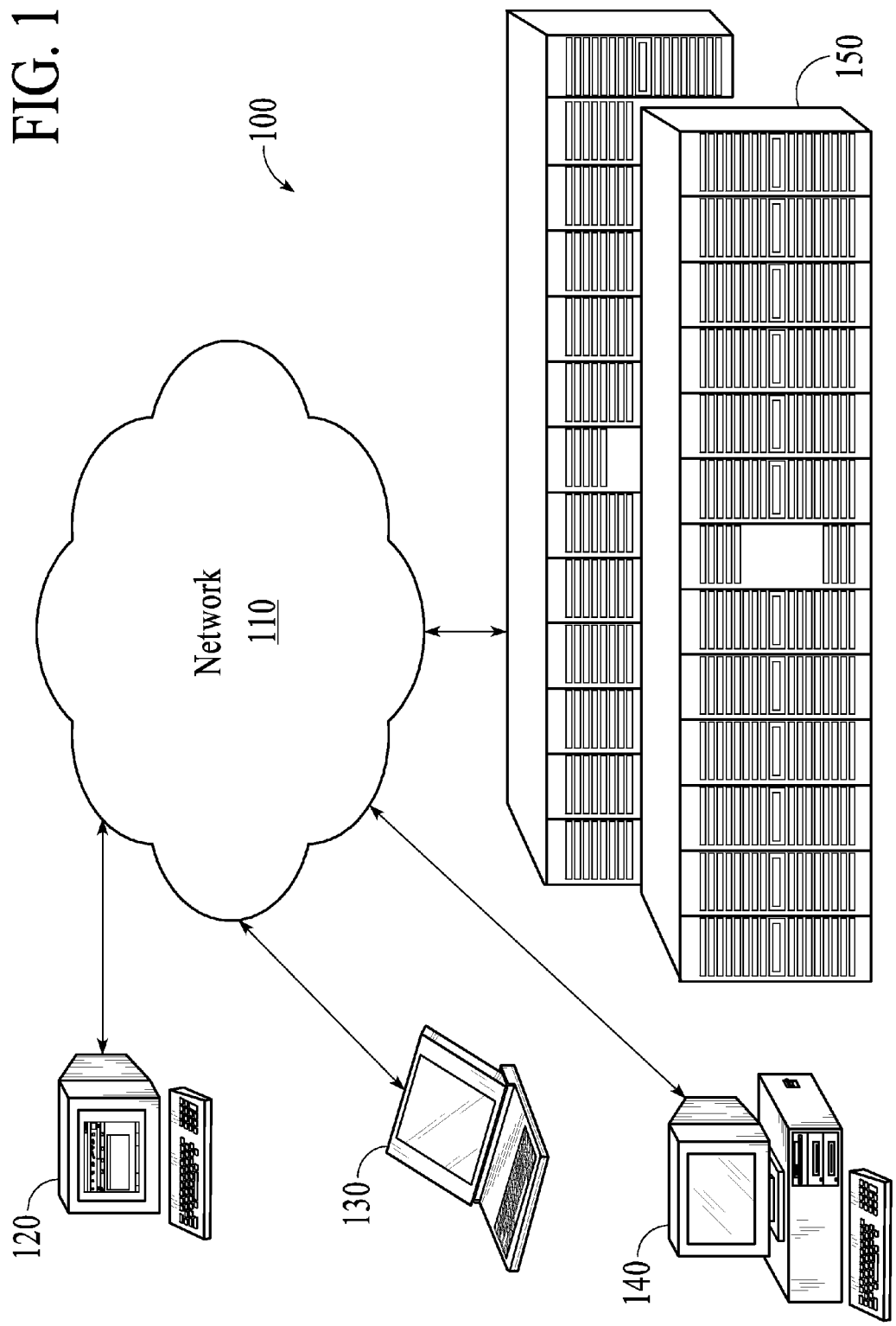
FIG. 1 is a diagram illustrating an example embodiment of a cloud-based data storage and processing system.

While this technology is susceptible of embodiment in many different forms, there is shown in the drawings and will herein be described in detail several specific embodiments with the understanding that the present disclosure is to be considered as an exemplification of the principles of the technology, and is not intended to limit the technology to the embodiments illustrated.

In this document, the terms "a" or "an" are used, as is common in patent documents, to include one or more than one. In this document, the term "or" is used to refer to a nonexclusive "or," such that "A or B" includes "A but not B," "B but not A," and "A and B," unless otherwise indicated.

The following detailed description includes references to the accompanying drawings, which form a part of the detailed description. The drawings show illustrations in accordance with example embodiments. These example embodiments, which are also referred to herein as "examples," are described in enough detail to enable those skilled in the art to practice the present subject matter. The embodiments can be combined, other embodiments can be utilized, or structural, logical and electrical changes can be made without departing from the scope of what is claimed. The following detailed description is, therefore, not to be taken in a limiting sense, and the scope is defined by the appended claims and their equivalents.

The techniques of the embodiments disclosed herein may be implemented using a variety of technologies. For example, the methods described herein may be implemented in software executing on a computer system or in hardware utilizing either a combination of microprocessors or other specially designed application-specific integrated circuits (ASICs), programmable logic devices, or various combinations thereof. In particular, the methods described herein may be implemented by a series of computer-executable instructions residing on a storage medium such as a disk drive, or computer-readable medium. It should be noted that methods disclosed herein can be implemented by a computer (e.g., a desktop computer, tablet computer, laptop computer), game console, handheld gaming device, cellular phone, smart phone, smart television system, and so forth.

The term "victim" or "reporting user" is defined herein as a person subjected to an attack, disparaging pictures, words or other material, and a person acting on behalf of a victim, for example a parent, guardian, relative of a deceased person or persons, and a member of a family. Additionally, a victim may include a product, a corporation, or an inanimate object. The victim as used herein can refer to one victim or multiple victims, and/or a victim's representative.

The terms "administrator" and "moderator" are defined herein as a person having authority to moderate complaint reports associated with attacks on victims. Some examples of the administrator include school administrators, arbitrators, mediators, patrons, advocates, solicitors, and principals.

The term "authority" is defined herein as any entity which can be relevant to resolution of attacks on victims. Some examples of authorities include parents, guardians, principals, representatives, school administration personal, mediators, and law enforcement officers.

The term "unfavorable item" is defined herein as items published on the Internet or elsewhere, and is also defined herein to include acts, for example physical bullying or harassment. This definition of the term "unfavorable item" applies herein whether combined with the word "published" or not.

A digital service provider is alternatively referred to as an Internet Service Provider (ISP), and is defined herein as any digital communication system, including but not limited to the ISP, a mobile telephone system (for text communications), a web application, and/or any other digital communication system. Additional systems falling within the definition of a digital service provider are blog hosts, microblogging hosts and/or sites (e.g. Twitter™), Facebook™, Tumblr™ feeds, and/or any other digital communication system.

The present technology may be implemented through agreements with schools, school districts, colleges, states, and/or non-governmental organizations. The technology may also be implemented through legislation and may be integrated with traditional law enforcement and/or civil actions.

The present technology automates the process of accepting and encrypting complaint reports from a victim of cyberbullying, for instance, a student. The present technology provides a school authority with the information from the complaint report and maintains records of complaint reports for central record keeping purposes. The system enables and facilitates alerting of additional responsible parties, for instance, parents, teachers, other school administrators, and/or legal authorities, including but not limited to the police, with information related to the complaint report. The system and method further provides a framework for resolving disputes and/or addressing improper conduct, and additionally provides a system for collecting district and/or state-wide (or broader regional) information relating to bullying and cyberbullying and/or the actions taken to address cyberbullying.

A reporting user (e.g., a victim) may populate a complaint report via a mobile application, software interface, voice interface and/or web interface, which may automatically pull information from the database to facilitate the process. The alleged perpetrator may have an opportunity to respond to the complaint report.

An arbitrator or school administrator can determine whether there is culpability on the part of the alleged perpetrator or any other party. Disciplinary action or fees may be assessed to the complaining party and/or the alleged perpetrator based on the arbitrator's decision or based on a school administrator's review of the facts and circumstances. Additionally or alternatively, if the arbitrator determines that the alleged perpetrator is culpable, the alleged perpetrator may be ordered to take down any offending content and/or cease displaying a link to the offending content if such offending content remains accessible.

Furthermore, a subscription model may be used to fund creation and implementation of the present system and method. For example, a per student annual fee may be imposed, and/or a school- or district-wide fee may be imposed for a subscription covering all students in a school or a district. Thus, the present technology provides for an automated procedure for a victim of libel, defamation and/or cyberbullying, which enables the efficient determination of the validity of a complaint and resolution of the matter.

The present technology further provides systems and methods for managing reputation from being tarnished and/or harmed by unfavorable material that is published online by various third parties. The systems and methods can allow a victim of such published unfavorable material to respond effectively to the publication of the unfavorable material. Presently, a victim of such published unfavorable material has very few options when such unfavorable material is published, and often must resort to legal proceedings.

A website according to example embodiments provides an opportunity for victims of unfavorable material published on the Internet to remove the unfavorable material. This unfavorable material may be of many types, including material that embarrasses, harasses, bullies, defames, or slanders a victim.

The online platform may be referred to as a Digital Remediation Platform, an Internet Protection Authority (IPA), or alternatively a Digital Protection Authority (DPA). The online platform may allow victims of unfavorable material published online with the ability to remove and suppress the unfavorable material concerning themselves and/or others without having to go through the traditional legal procedures. Building on that need, the website and online platform may offer an alternative to quickly resolve the problems associated with unfavorable material published online. The website may be secured by requiring users to provide credentials such as passwords, as well as by encrypting data. In this manner, data safety may be ensured. Additionally, the system provided herein may be "closed" meaning that a user may have to log-in to receive communications from the system, rather than receiving emails or other "open" communications.

An example workflow may proceed as follows. First, an avatar can be created, which may include the name "Digital Advocate" or "Scarlet Advocate" or "Scarlet Army". Second, direct or standard use by a victim may include creating an identification (ID) and filing a case to remove defamatory content. Alternatively, an indirect user and/or a digital advocate, for example a friend, relative, champion or "Good Samaritan" can log into the system, create an account, and file a case on behalf of a victim. In this case, the digital advocate may be associated with an avatar, handle, and/or ID. Next, the digital advocate may receive points for removals represented by digital wins or good deeds, and may have their own statistics page. In this manner, the digital advocate may accumulate digital wins and increase its rating (for example, white belt to a black belt, or a private to a general). Victims can enlist the help of digital advocates to help them obtain their goal of removal of the defamatory content. In further embodiments, crowd sourcing may be utilized to form a digital posse to identify a poster and all relevant defamatory content. In this manner, digitally based help is enlisted to address a digitally based problem (defamation/invasion of privacy) to the benefit of a real victim with the ultimate goal of removal of the content.

A digital questionnaire methodology may be utilized in certain example embodiments. Questions may be sequenced based on evidence provided and/or described, as well as previous answers. Proprietary algorithms may be used, and may be based on evidence and a proprietary DPA Digital Defamation and Privacy Code, to determine the type and sequencing of questions. A severity score may be produced based on the evidence and answers to the questions. Finally, a customized Strongly Worded Letter may be automatically recommended based on the answers to questions, the evidence provided, and the resultant severity score.

A pre-arbitration/mediation process may be provided including a log-in by a Pre-Arb Arbitrator who reviews answers and evidence included in the digital questionnaire. The Pre-Arb Arbitrator may review severity score and an automatic Arbitration Success Score, which may include an automated evaluation of the claim. The score may be based on a DPA International Defamation and Invasion of Privacy Codification. The Pre-Arb Arbitrator may review evidence and/or facts to confirm the existence of the claim, and may survey and/or send a victim a standard set of questions. The Pre-Arb Arbitrator, based on evidence and any survey responses from the victim, may either recommend, or not recommend, DPA arbitration/mediation.

The present technology may also provide a mobile application interface and/or downloadable mobile application that may access the systems and methods that are stored online. The present technology may be implemented through agreements with search engines, legislation and/or non-governmental organizations. The present technology may be integrated with traditional law enforcement, arbitration and/or civil actions.

The present technology can automate the process of accepting a complaint related to unfavorable material about a victim that is published online, preparing and sending a communication to a suspected third party publisher, and populating a database with information relating to the complaint and any publisher information. The present technology provides an authority to receive a response to the complaining communication and an avenue for the victim to further pursue the complaint if the publisher denies fault and/or fails to implement an agreement as promised in their communication. The victim may populate the complaint either through a traditional web browser, or through other avenues such as through a mobile application interface.

Once populated, the complaint may automatically pull information from the database to facilitate the process. The publisher of the unfavorable material may be provided with an opportunity to respond to the complaint, possibly regardless of whether they have responded to the complaining communication. The complaint and response may be electronically and automatically submitted to an arbitrator for a determination of culpability.

The arbitrator may determine that there is no culpability on the part of the publisher of the unfavorable information, or any party. In such situation, no further action may be taken, and any fees may be assessed to the complaining party.

The arbitrator may alternatively determine that the publisher, or a party related to the publisher, is culpable. In such a situation, the publisher, the publisher's ISP, and/or any search engines that display the search results containing the unfavorable information may be ordered to take down the unfavorable material, and/or cease displaying a link to the unfavorable material if the publisher fails to remove the unfavorable material.

FIG. 1 illustrates cloud-based data storage and processing system 100 that may be used to implement the present technology. Cloud-based data storage and processing system 100 includes datacenter 150 communicatively coupled to network 110. Datacenter 150 may be configured to store instructions and data associated with the systems and methods of the present technology, such as a database containing complaints and results of complaints. Network 110 may be a wide-area network (WAN), a local area network (LAN), the Internet, and/or any other appropriate network.

Customers/victims may access cloud-based data storage and processing system 100 by using customer terminal 140, which may be a computer, laptop computer, mobile device or any other system used to communicate via network 110. Administrators of the present technology may access the cloud-based data storage and processing system 100 by using administrator terminal 130, which may be a computer, laptop computer, mobile device or any other system used to communicate via network 110. Administrators may include, but are not limited to, arbitrators, employees and officers. Publishers of the present technology may access the cloud-based data storage and processing system 100 by using publisher terminal 120, which may be a computer, laptop computer, mobile device or any other system used to communicate via network 110. Publishers may include, but are not limited to, publishers of unfavorable information, ISPs and search engines.

Figure 2:
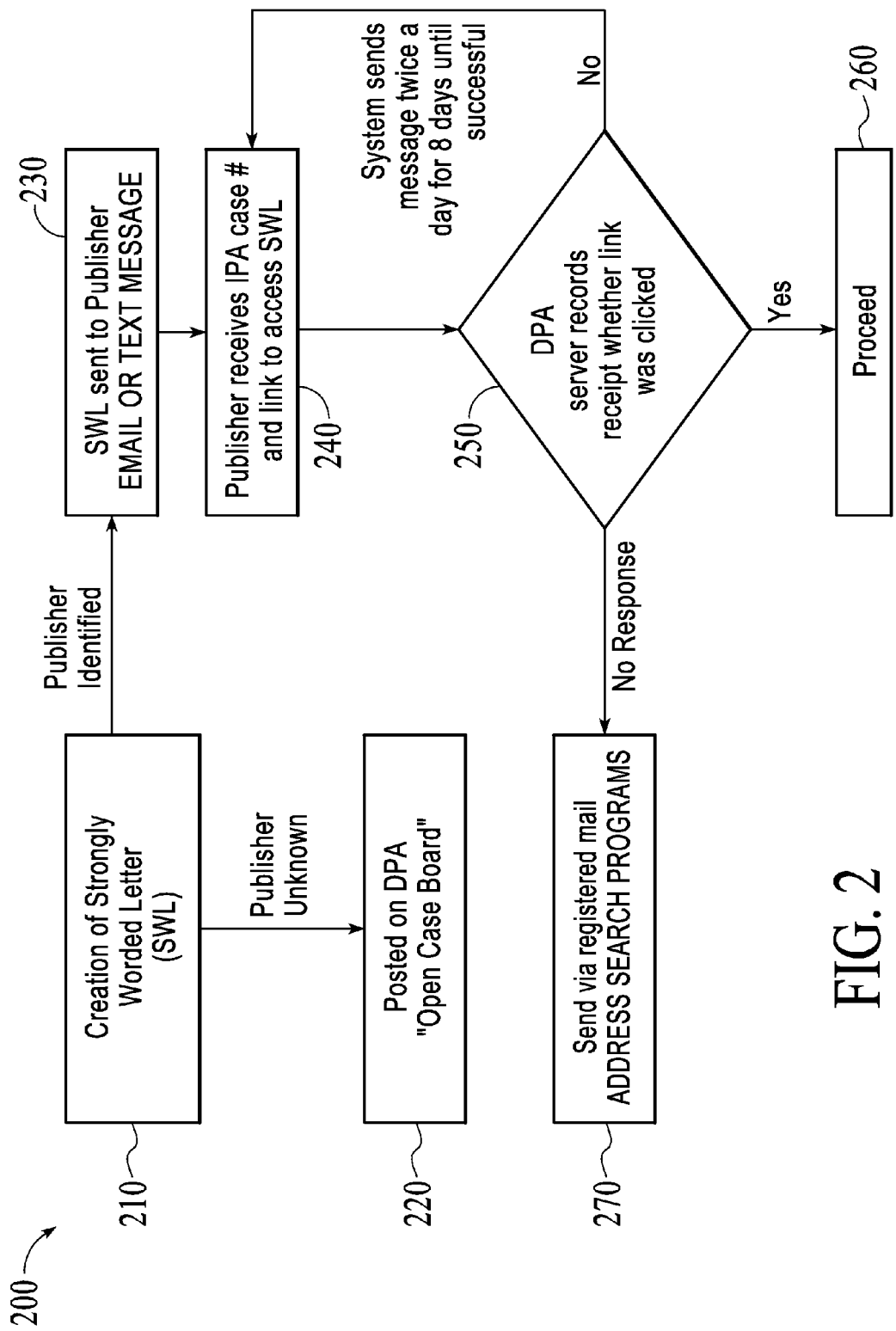
FIG. 2 is a flow chart illustrating an example method.

FIG. 2 shows a flow chart illustrating an example method 200 of the present technology. After the receipt of a complaint from a victim, method 200 begins with step 210, in which a strongly worded letter (SWL) addressed to the publisher of the unfavorable information is created. If the publisher of the unfavorable content is not known and/or not ascertainable from the information provided by the victim in the complaint, the SWL is posted on a publicly accessible Internet posting board (also referred to as a Digital Protection Authority (DPA) "Open Case Board") in step 220. Once the SWL is posted to the DPA Open Case Board, Internet users may visit the DPA Open Case Board and may be able to provide information that may lead to the uncovering of identity of the publisher and/or publishing entity. Additionally, Internet Service Providers (ISPs) and/or search engines (e.g. Google™, Yahoo!™) may also visit the DPA Open Case Board to determine whether the unfavorable content is hosted and/or searchable through the various services these entities provide.

If, in example method 200, the publisher of the unfavorable material is identified in the complaint, or is identified in some other manner in which it allows the publisher to be contacted, the SWL is sent to the publisher in step 230 by electronic mail, text message, physical mail and/or any other similar method by which the publisher would likely receive the SWL. In some embodiments, the communication sent to the publisher in step 230 will contain a hyperlink or other means by which the publisher may receive a Digital Protection Authority (DPA) case number and a link to access the various document associated with the DPA case. These documents may include, but are not limited to, the SWL, a binding settlement agreement, a response form, and an agreement to arbitration form.

After the publisher receives the link sent in step 240, the Digital Protection Authority will determine and record in step 250 whether the publisher in receipt of the communication actually accessed the content using the link provided in the communication. If the recipient of the communication sent in step 230 has not accessed the content using the link provided in the communication, the method 200 may resend the communication in step 230 twice a day for eight days from the original communication date, or until the recipient of the communication clicks on the link provided.

Alternatively, after the publisher receives the link in step 240, the Digital Protection Authority can determine and record in step 250 whether the publisher in receipt of the communication actually clicked on the link provided in the communication. If the recipient of the communication does click on the link provided in the communication, but does not respond within the DPA server, the method 200 may send, in step 270, via registered mail or some other alternative method (e.g., FedEx or UPS), the communication provided in step 240 as well as the SWL created in step 210 to the recipient of the communication of step 240. The method 200 may utilize an address search program in order to determine the address of the recipient in step 270.

If, in step 250, the DPA server records an affirmative click of the link provided in the communication of step 240, and the recipient of the communication of step 240 responds to the various communications contained therein (e.g. the DPA case and the SWL), the method 200 may proceed along further avenues in step 260. These further avenues may include the publisher of the unfavorable material agreeing to remove the material voluntarily and/or digitally or physically signing an agreement to remove the unfavorable material.

Alternatively, the publisher of the unfavorable material may allege that the published material is true and, therefore, deny the request to remove the material. In such situation, the method may proceed along the route of the arbitration of the dispute by an independent arbitrator, who can include a lawyer, a retired lawyer, a judge, a retired judge, a licensed arbitrator, a law school graduate, or some other individual or panel qualified to hear and adjudicate disputes. In alternative embodiments, the arbitration process may be fully automated based on a proprietary rule or code.

In other embodiments of step 260 of method 200, the publisher of the unfavorable information may deny that he or she has published the unfavorable information that is the subject of the method 200. In such situations, the method may allow for further investigation into the source of the published information, with or without the cooperation of the alleged publisher of the information. Alternatively, if the victim alleges that the party denying publishing the information is indeed the publisher, then the method 200 may proceed to the arbitration as described above.

In yet further embodiments of step 260 of method 200, if the publisher does not agree to remove the unfavorable information, the victim may be presented with additional options. These options may include, but are not limited to, notifying the publisher's parents of the dispute, notifying the publisher's school of the dispute, notifying the publisher's employer of the dispute, notifying the police or local district attorney of the dispute, notifying the publisher's ISP of the dispute. Each of the notifications of the dispute discussed above may include some or all information relating to the unfavorable published material, and may be followed by an arbitration process.

FIG. 3 depicts a screenshot of a progress chart 300 illustrating an example method of the present technology. Within the progress chart 300, there may reside a victim progress pane 310, a publisher progress pane 320, and an arbitration progress pane 330.

In certain embodiments, victim progress pane 310 may be populated with a number of different check boxes that may be filled in during the progression that occurs after the initial complaint is filed with the Digital Protection Authority. Victim progress pane 310 may show a level of attack that has been determined, by the victim, the DPA and/or another party, to fit the unfavorable material that has been published online. Victim progress pane 31 may also inform a user when and if the SWL has been sent to the publisher, when the victim or the publisher has elected to pursue expedited pre-arbitration review, when the second removal request has been sent to the publisher, and/or when the complaint has been submitted and approved for arbitration at the Digital Protection Authority.

The pre-arbitration review process may include additional communications to the publisher, and/or may include an evaluation of the claim by a review person or persons that counsels a victim or victim representative to pursue, modify or drop a claim. The present embodiment may also include a system for addressing true but damaging publications, with a request for removal being based on fairness and morality. This equitable request may involve a different communication being sent to the publisher.

If, after the review process for expedited arbitration has been performed, victim progress pane 310 may also show when the final removal request has been sent to the publisher of the unfavorable material, and whether the publisher has elected to pursue arbitration at the Digital Protection Authority.

If it is has been determined that arbitration will be performed by the Digital Protection Authority, victim progress pane 310 may further inform a user when a digital complaint form is filled out along with any attachments, when an notification has been sent out with the dates of the arbitration, and/or when the victim responds to the publisher's initial response in the arbitration.

In some embodiments, publisher progress pane 320 may also be populated with a number of different check boxes which may be filled in during the progression that occurs after the initial complaint is filed with the Digital Protection Authority. These check boxes may allow a user to quickly see whether or not the publisher of the unfavorable information is known, whether the publisher has responded to the strongly worded letter, and also whether the publisher has agreed to voluntarily remove the unfavorable material that has been published online.

Publisher progress pane 320 may also allow a user to quickly see whether the publisher has responded to the second removal request sent from the Digital Protection Authority, whether the publisher has responded to the final removal request sent from the Digital Protection Authority, whether the publisher has agreed to arbitration at the Digital Protection Authority, and/or whether the publisher has made any type of response to the victim of the unfavorable material that is published online.

In certain embodiments, arbitration progress pane 330 may allow a user to quickly determine whether an independent arbitration has been assigned to the arbitration process, whether an arbitration decision has been announced, and/or whether the victim of the unfavorable material has been vindicated with a Certificate of Vindication. Alternative indications of vindication may include emails, postings on a community board, and/or any other appropriate indication that a person's reputation has been vindicated by the process described herein.

Figure 4:
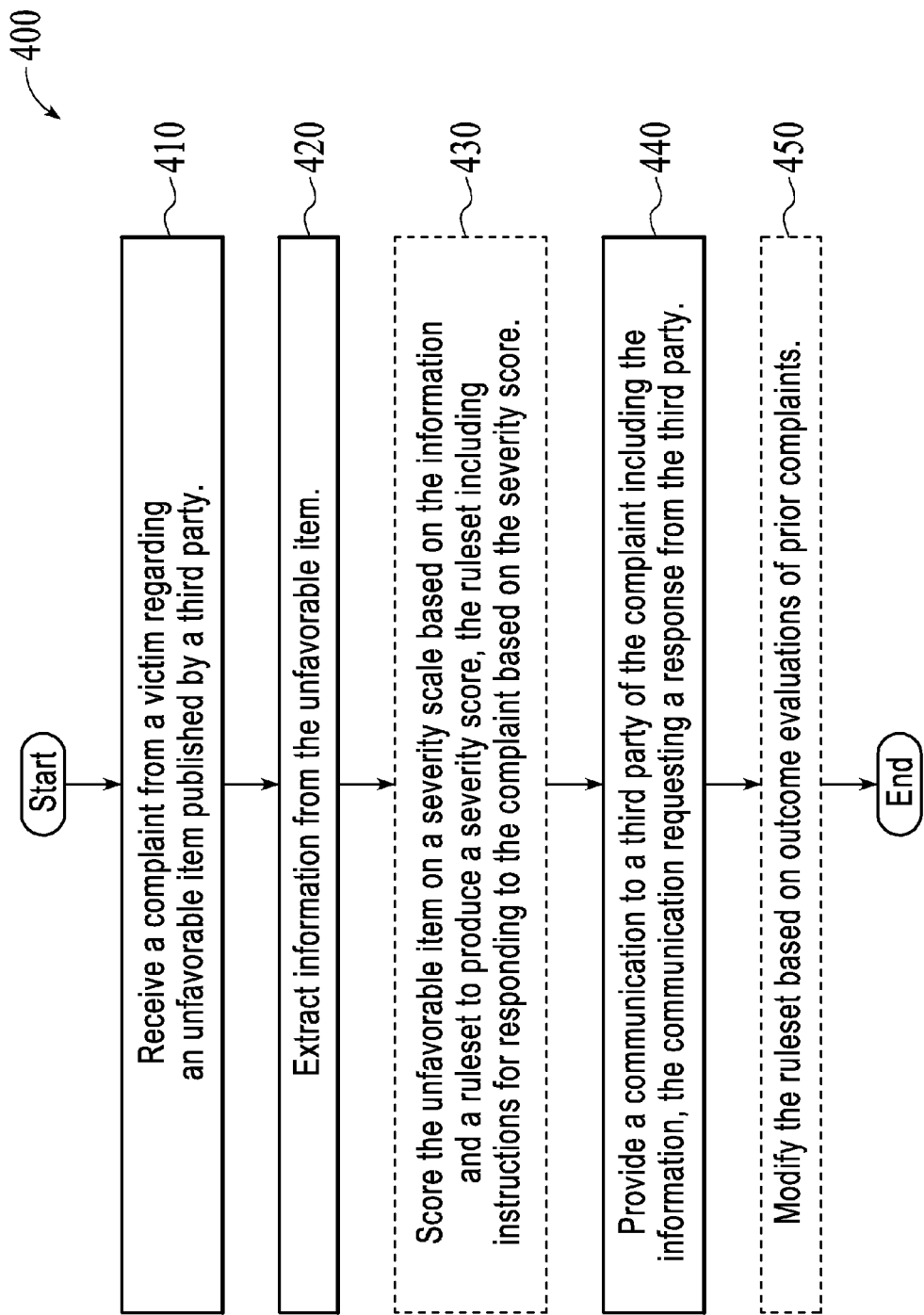
FIG. 4 is a flow chart illustrating an example method.

FIG. 4 is a flow chart illustrating an example method 400 of the present technology. At step 410, a system may receive a complaint from a victim regarding an unfavorable item published by a third party online. The unfavorable item may be published on the Internet in a number of different websites, including but not limited to, a social media site, a personal blog, a micro blogging site, and a website. The third party that published the unfavorable item may be an individual, a group of individuals and/or any other entity capable of publishing the unfavorable item online.

In step 420 of method 400, the system may extract certain information from the unfavorable item. The extracted information may include a picture, a video segment, a text segment, and an audio segment. An additional archiving operation may be performed prior to the extracting operation.

In optional step 430 of method 400, the system may score the unfavorable item on a severity scale based on the information and a rule set to produce a severity score. The rule set may include instructions for responding to the complaint based on the severity score. The response requested may include a number of choices from which the third party may choose in order to respond. These choices include, but are not limited to, asserting that the unfavorable item is true and declining to remove it, asserting that the unfavorable item is true but agreeing to remove it, denying responsibility for publishing the unfavorable item, agreeing with the communication and agreeing to remove the unfavorable item, and disagreeing with the communication and declining to remove the unfavorable item.

In step 440 of the method 400, the system may provide a communication to the third party of the complaint. The communication may include the extracted information. The communication to the third party of the complaint may also request a response from the third party.

In optional step 450 of method 400, the system may modify the rule set based upon the outcome of previous complaints. This modification of the rule set may be based upon, but not limited to, the language associated with previous complaints, the general characteristics of responses from the third parties to previous complaints, the results of previous complaints, the results of previous arbitration(s), the results of previous strongly worded letters, the results of previously providing information to ISPs, and the results of previously requesting that search engines remove certain terms and unfavorable material from search databases. Modifying the rule set pursuant to optional step 450 may be performed continuously whenever a previous complaint has resolved, either in favor of or against a previous victim who filed a complaint.

Figure 5:
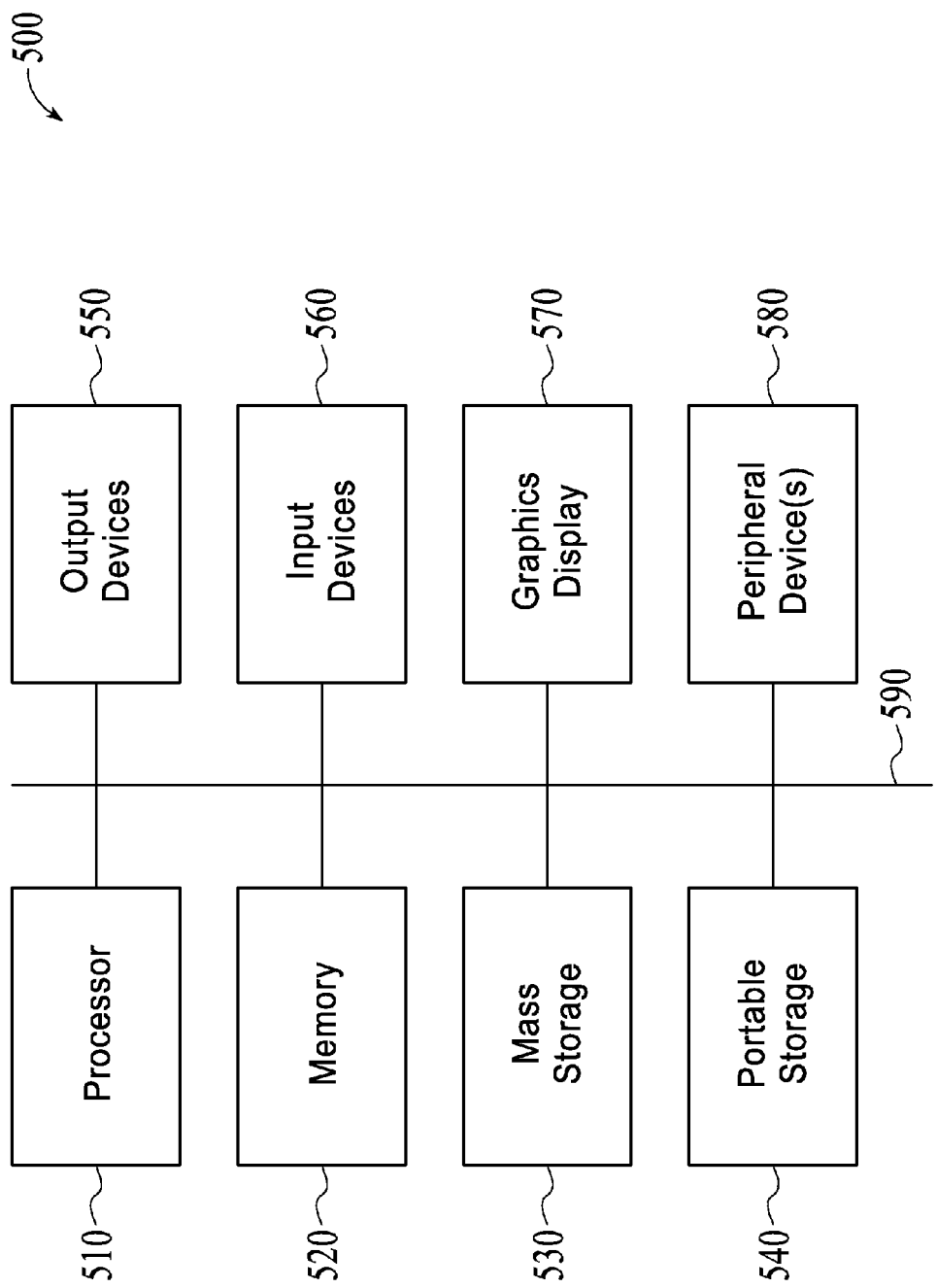
FIG. 5 is a schematic of a computer system according to an example embodiment.

FIG. 5 illustrates an example computing system 500 that may be used to implement an embodiment of the present technology. For example, network 110, administrator terminal 130, customer terminal 140 and/or publisher terminal 120 may be implemented by one or more of the components of computing system 500. Additionally or alternatively, computing system 500 may be used to implement method 400 of FIG. 4. The computing system 500 of FIG. 5 includes one or more processors 510 and memory 520. Memory 520 stores, in part, instructions and data for execution by the one or more processors 510. Memory 520 can store the executable code when the computing system 500 is in operation. The computing system 500 of FIG. 5 may further include a mass storage 530, portable storage 540, output devices 550, input devices 560, a graphics display 570, and other peripheral device(s) 580.

The components shown in FIG. 5 are depicted as being connected via a single bus 590. The components may be connected through one or more data transport means. The one or more processor 510 and memory 520 may be connected via a local microprocessor bus, and the mass storage 530, peripheral device(s) 580, portable storage 540, and graphics display 570 may be connected via one or more input/output (I/O) buses.

Mass storage 530, which may be implemented with a magnetic disk drive or an optical disk drive, is a non-volatile storage device for storing data and instructions for use by one or more processor 510. Mass storage 530 can store the system software for implementing embodiments of the present technology for purposes of loading that software into memory 520.

Portable storage 540 operate in conjunction with a portable non-volatile storage medium, such as a floppy disk, compact disk or digital video disc, to input and output data and code to and from the computing system 500 of FIG. 5. The system software for implementing embodiments of the present technology may be stored on such a portable medium and input to the computing system 500 via the portable storage 540.

Input devices 560 provide a portion of a user interface. Input devices 560 may include an alphanumeric keypad, such as a keyboard, for inputting alphanumeric and other information, or a pointing device, such as a mouse, a trackball, stylus, or cursor direction keys. Additionally, the computing system 500 as shown in FIG. 5 includes output devices 550. Suitable output devices include speakers, printers, network interfaces, and monitors.

Graphics display 570 may include a liquid crystal display (LCD) or other suitable display device. Graphics display 570 receives textual and graphical information, and processes the information for output to the display device.

Peripheral device(s) 580 may include any type of computer support device to add additional functionality to the computing system. Peripheral device(s) 580 may include a modem or a router.

The components contained in the computing system 500 of FIG. 5 are those typically found in computing systems that may be suitable for use with embodiments of the present technology and are intended to represent a broad category of such computer components that are well known in the art. Thus, the computing system 500 of FIG. 5 can be a personal computer, hand held computing system, telephone, mobile computing system, workstation, server, minicomputer, mainframe computer, or any other computing system. The computer can also include different bus configurations, networked platforms, multi-processor platforms, etc. Various operating systems can be used including UNIX, Linux, Windows, Macintosh OS, Palm OS, and other suitable operating systems.

FIG. 6 is screenshot 600 of an online computer system according to an example embodiment. Screenshot 600 illustrates an evidence review and upload interface. A user may view a set of previously uploaded evidence, delete items of evidence, upload additional evidence, and/or add comments to previously uploaded evidence using the online computer system illustrated in screenshot 600. After uploading evidence, a series of questions may be presented to the user to assist the system at arriving at a severity rating or score for the publication of the unfavorable item(s). The severity score may be based in part on the truth or falsity, or partial truth or falsity, of the unfavorable items. The questions presented to the user may be generated automatically based on an algorithm. In various example embodiments, a user may initially score the unfavorable items on a severity scale indicating a level of offensiveness. The system may then re-score the unfavorable items based on the responses to the queries, information extracted from the unfavorable item(s), and or an algorithm or rule set (alternatively referred to as an expert system).

Further embodiments of the present technology provide for reporting, alerting, reviewing, and helping in resolving online personal attacks such as cyberbullying attacks directed to minors and students in schools and colleges. In general, this technology involves a reporting interface and an administrator interface, both accessible via a mobile device, mobile application, or browser. The reporting interface can be utilized by a victim (or witness) to make a complaint report. The complaint report can be created by filling text fields, answering questionnaires, selecting appropriate check boxes, and so forth. Once the complaint report is generated, the technology enables to alert a school administrator with details of the incident with any hyperlinks or files as were given in the complaint report. The school administrator may then alert other officials, authorities, parents and other involved parties who require notification. For these ends, the school administrator utilizes the administrator interface which enables to view the complaint report, assign a status to the report, make updates, notes, see timeline logs, alert to others, communicate with the victim, aggressor, parents, teachers, authorities, and so forth. For these ends, the administrator interface include multiple digital task management tools (discussed below) which make it easy to keep track of administrator's follow-up reports. The tools also enable the school administrator to secure message with other participants including a victim, aggressors, principal, officers, authorities, parents, third parties, etc. The tools also enable to manage and file local and state mandated reports, in those instances which require reporting by local, state or federal laws. Therefore, the school administrator or other authorities can respond appropriately and proportionately to the attack immediately using the administrator interface. As an additional feature, the school administrator, authorities, parents, guardians, teachers and other involved parties may browse and receive recommendations from a curated library or resources. These may include videos, interactive learning, curriculum, books, articles, crisis live-chat, hotlines, and many more. The user also will have the ability to rate the quality, effectiveness and other relevant attributes of the curated content.

In the meantime, the present technology provides a real-time record of all data that can be used to produce customized, digital reports including statistical information. The statistical information can be aggregated automatically and delivered to the parties of interest, such as a school administrator, at a request. The statistical information may bear analytics which provide the school administrator with real-time interactive big-picture look at the entire student body.

Notably, all sensitive information of complaint reports is encrypted and secure. For these ends, the technology may employ a perimeter network known as a "virtual DMZ" (Demilitarized Zone). The virtual DMZ is a physical or logical subnetwork that may contain and expose an organization's external-facing services to a larger and untrusted network, usually the Internet. The purpose of virtual DMZ is to add an additional layer of security to an organization's local area network (LAN); an external attacker only has direct access to equipment in the DMZ, rather than any other part of the network. Security features may also employ a number of firewalls to control incoming and outgoing network traffic based on applied rule set. Additional security features include authentication and/or authorization processes for all users of the technology. For example, a victim, student, parent, teacher and a school administrator need to utilize logins and passwords to be able to utilize the reporting interface and administrator interface, accordingly. Yet more security features include logging all events associated with complaint reports, monitoring activities of all participants, auditing, alerting/reporting, and many more.

Therefore, complaint reports and data associated with the complaint reports remain secure and private at all times. According to some embodiments, each school can provide a closed community in terms of the present technology. Unique accounts or profiles can be generated for each student, minor, school administrator, parent, guardian, and staff member. Only these pre-approved individuals may access the system. All data is prohibited from being re-transmitted to anyone outside of the system. Moreover, user-submitted data is visible to top school officials, who maintain full control over whether this information is shared with other users (such as parents, security, etc.).

Additionally, according to the embodiments, confidentiality and privacy is strictly preserved in the system. The identity of the individual filing a complaint report is revealed only to the administrator or moderator. This ensures that all complaint reports have a verifiable source. Names written within a complaint report are redacted when shared with parents, and identities are turned into numbers at levels beyond school administration to protect identities. The present technology also provides that user information can never be shared with unauthorized third parties. After students have matriculated out of the school system, their information is anonymized within the databases used.

Figure 7:
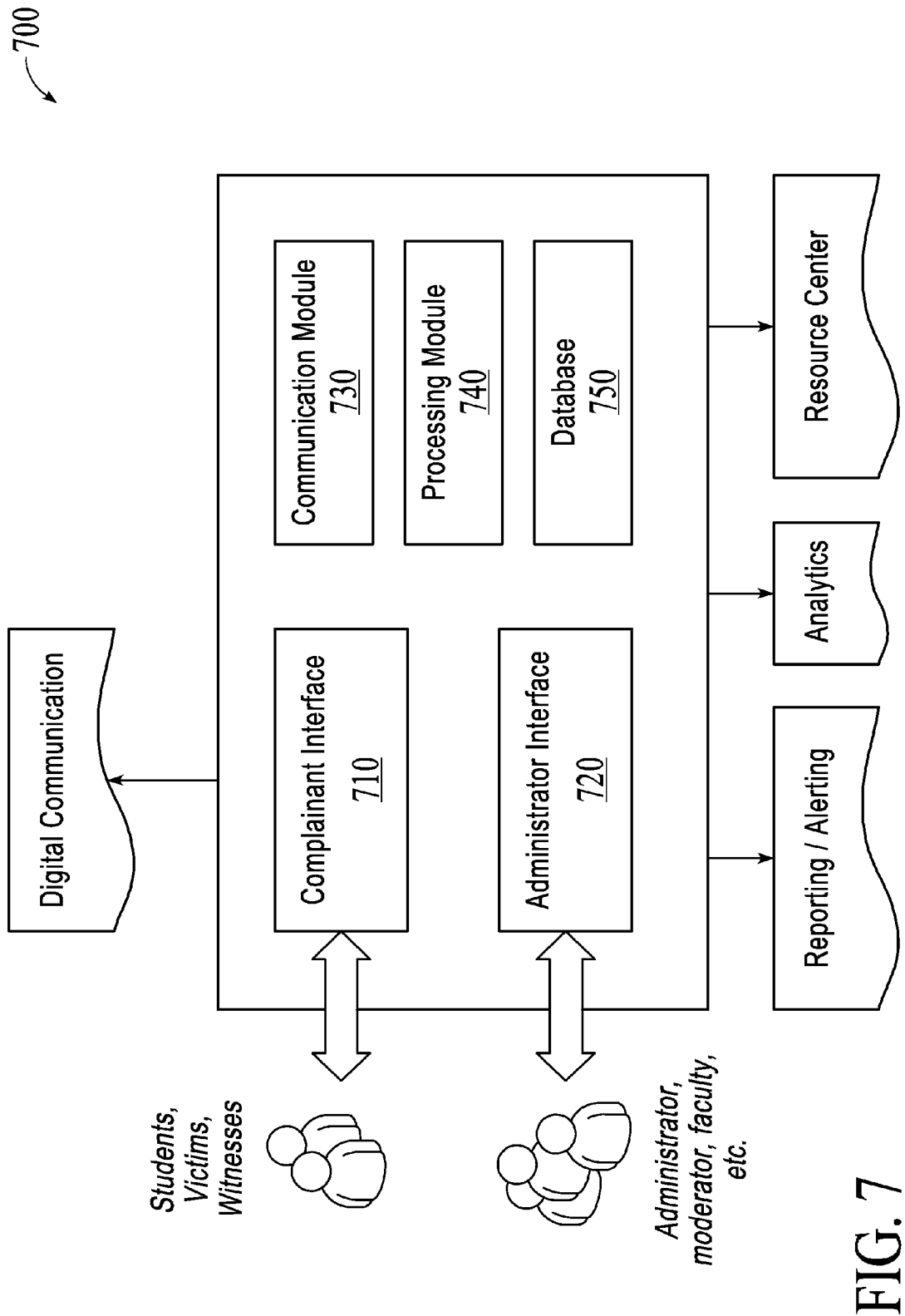
FIG. 7 shows a high-level block diagram of a system for managing and processing complaint reports.

FIG. 7 shows a high-level block diagram of a system 700 for managing and processing complaint reports according to some embodiments of the present disclosure. As already mentioned above, the system 700 includes a reporting interface 710 which can be accessed by victims and witnesses only (e.g., parents, teacher, students, minors). The reporting interface 710 includes a graphical interfaces and corresponding tools adapted to generate a complaint report by entering information, making selections, answering quiz questions, and the like. An administrator (such as school administrator, permissioned/approved faculty members, parents, etc.) can access an administrator interface 720 which is adapted to enable the administrator to view complaint reports, alert, report, edit information, assign statuses, and many more.

The system 700 also includes a communication module 730 configured to receive and transmit complaint reports, deliver messages between parties of the system 700, provide data transfer, generate and send alerts, and do any other communication related tasks. Processing module 740 is responsible for operation of the entire system, which includes, inter alia, data aggregation, application of rule sets, data analytics, generation of alerts and reports, and so forth. Database 750 may maintain data accounts or profiles, complaint reports, data records associated with complaint reports, processor-readable or machine readable instructions and codes, and so forth. As shown in FIG. 7, as a result of the operation of system 700, there are provided three major functionalities: reporting/alerting, analytics, digital communication, and recourse center content recommendations.

Importantly, the system 700 may include hardware and/or software components such that it can be implemented as a web service, cloud-based service, distributed computing system, and alike. The system 700 may employ web pages, websites, mobile applications, downloadable software applications, browser-based applications, and so forth. Moreover, the system 700 may include some or all of the elements discussed above with reference to FIG. 5.

Figure 8:
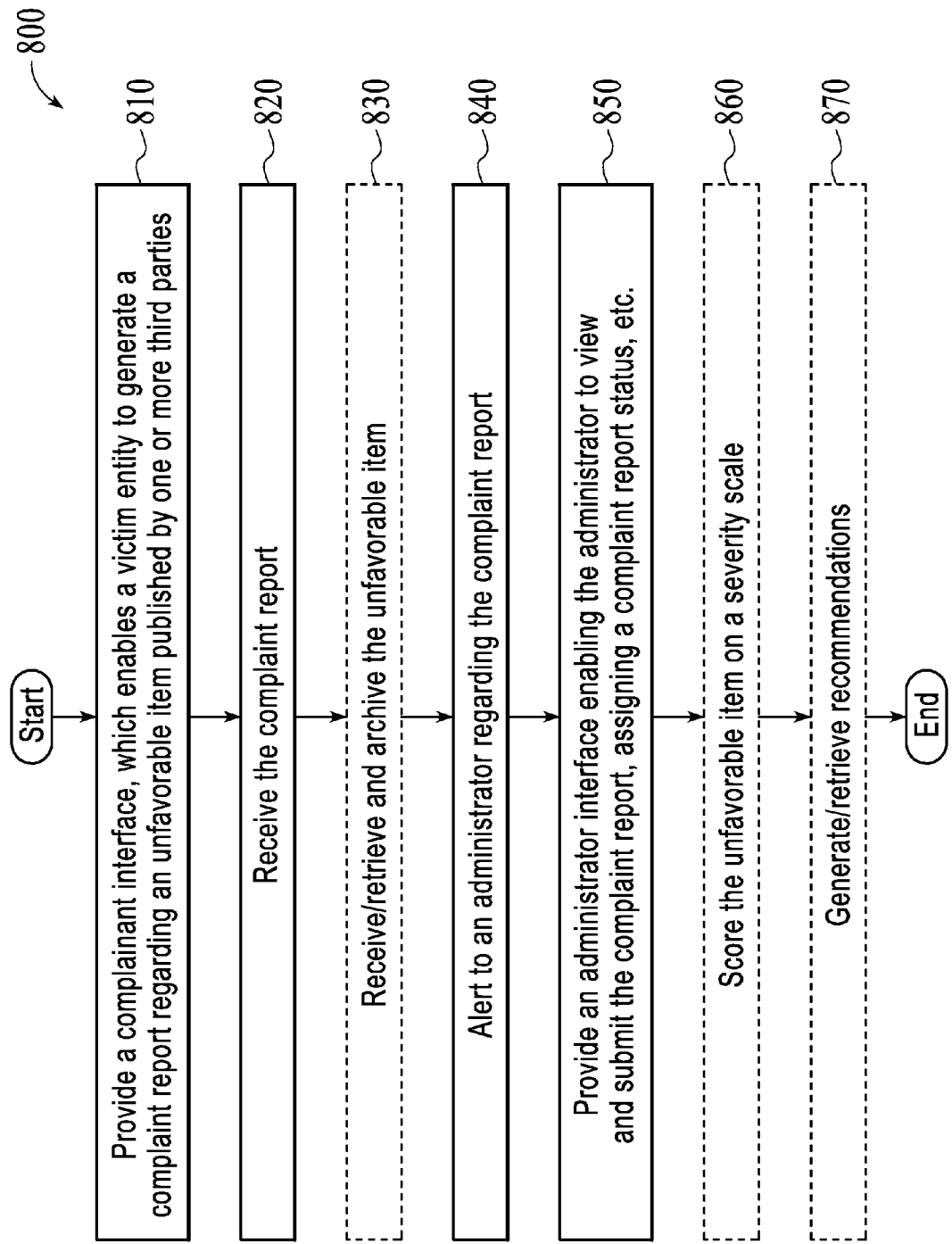
FIG. 8 is a flow chart illustrating an example method for managing and processing complaint reports.

FIG. 8 is a flow chart illustrating an example method 800 for managing and processing complaint reports according to some embodiments of the present disclosure. The method 800 may be performed by processing logic that may comprise hardware (e.g., decision making logic, dedicated logic, programmable logic, and microcode), software (such as software run on a general-purpose computer system or a dedicated machine), or a combination of both. In one example embodiment, the processing logic refers to the system 700 or its components. In other words, the method 800 can be performed by various components discussed above with reference to FIGS. 5 and 7. Notably, the below recited steps of method 800 may be implemented in an order different than described and shown in FIG. 8. Moreover, the method 800 may have additional steps not shown herein, but which can be evident for those skilled in the art from the present disclosure. The method 800 may also have fewer steps than outlined below and shown in FIG. 8.

The method 800 commences at step 810 with the system 700 providing the reporting interface 710, which enables a reporting user to generate a complaint report regarding an unfavorable item published by one or more third parties. The unfavorable item may relate to a still or moving image, audio, text or multimedia content. The publication of unfavorable item may occur on social networking sites, blogging sites, and virtually on any possible web page. The complaint report can be generated by providing by the reporting user information about defamation, bullying, or other attack, hyperlinks to the unfavorable item, responses to predetermined questions, and so forth.

In step 820 of method 800, the system 700 receives the complaint report. Upon the receipt of the complaint report, the system 700 may encrypt or secure sensitive information of the complaint report. The system 700 also stores and/or archives the complaint report in the database 750.

In step 830 of method 800, the system 700 receives/retrieves and archives the unfavorable item associated with the complaint report.

In step 840 of method 800, the system 700 alerts to an administrator regarding the complaint report. In some embodiments, the system 700 may also alert to one or more additional parties associated with the complaint report (authorities, parents, etc.) according to predetermined rules.

In step 850 of method 800, the system 700 provides an administrator interface enabling the administrator to view the complaint report, submit the complaint report to an authority, assign a complaint report status to the complaint report, among other things.

In step 860 of method 800, the system 700 may optionally score the unfavorable item on a severity scale based on at least one of data associated with the complaint report, a bias type, a category of incident, a location of incident, an aggressor name, responses to queries, and a rule set to produce a severity score. The rule set may include instructions for responding to the complaint report based on the severity score. In some embodiments, the system 700 may score the complaint report instead of scoring of the unfavorable item or in addition to the scoring of the unfavorable item. Notably, the system 700 may dynamically modify the rule set based on outcome evaluations of prior complaint reports. The outcome evaluations of prior complaint reports may be generated automatically. The score of the unfavorable item and/or the complaint report can be further used in analytics or for determining the method of alerting.

At step 870, the system 700 optionally generates/retrieves recommendations to the administrator, victim or any other party based at least in part on the complaint report and/or the score. The recommendations can relate to suggestions or aid in resolving cyberbullying attacks and dealing with the aggressor. The recommendations may also depend on the number, frequency and type of complaint reports filed. The recommendations could also be helpful for teachers in finding best curriculum and aid parent in discovering the best articles and advice videos.

Figure 9:
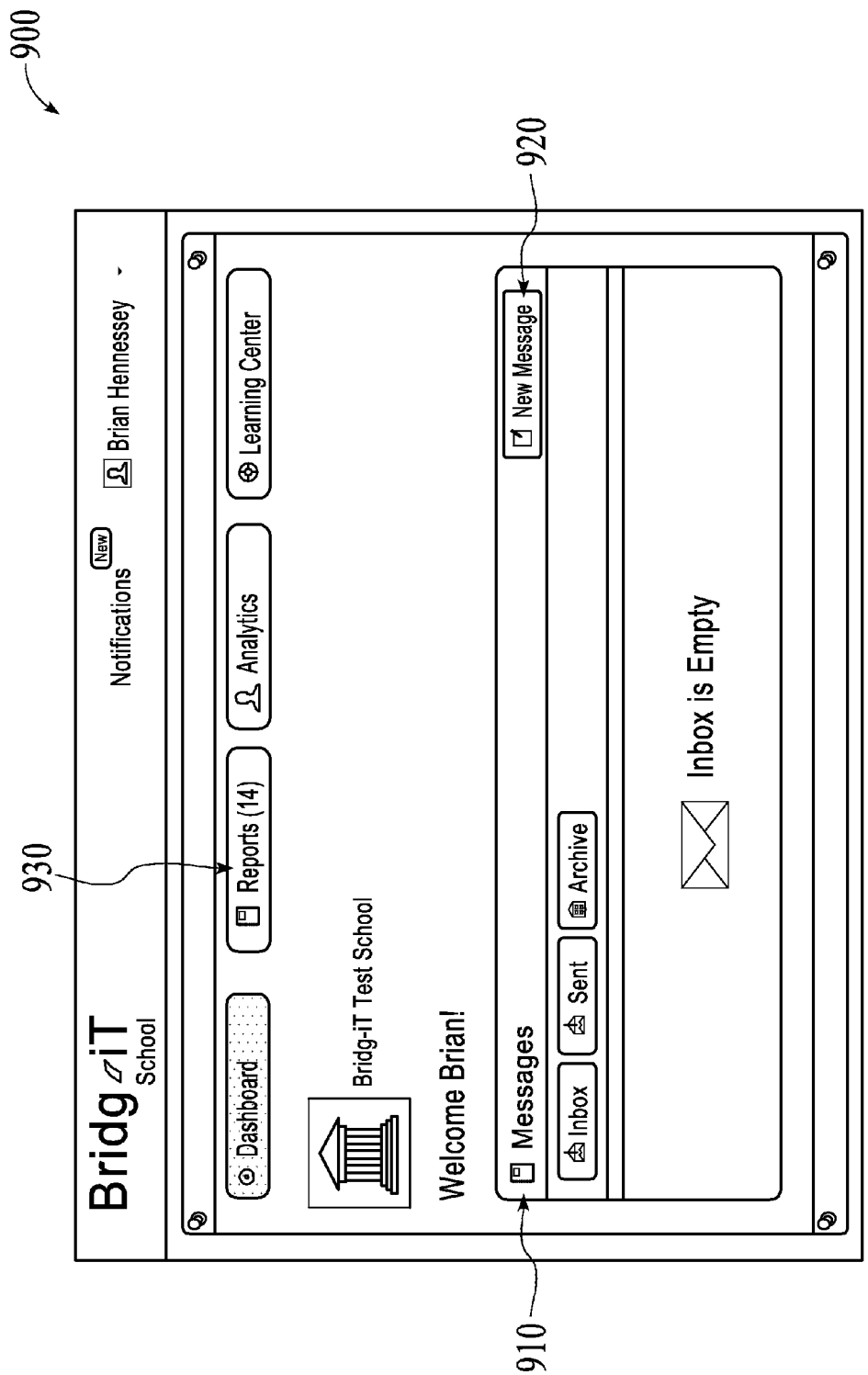
FIG. 9 is a screenshot of a dashboard.
Figure 10:
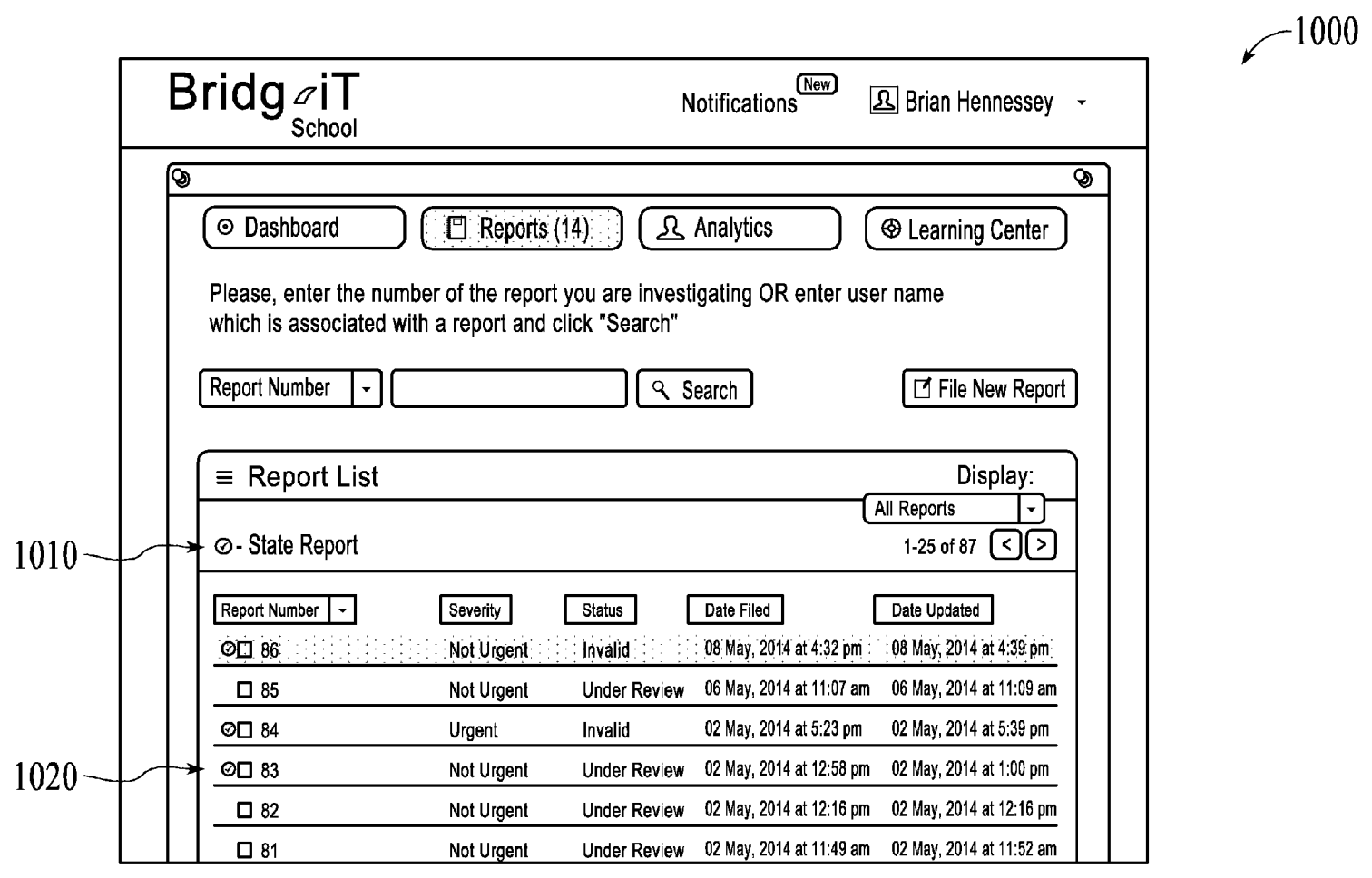

FIG. 9 is a screenshot 900 of a dashboard graphical interface of a computer system according to an example embodiment. In some embodiments, the screenshot 900 are a part of administrator interface 720. Screenshot 900 includes a widget or container 910 for showing particulars of received, sent and archived messages. A user may generate a new message upon pressing on a clickable "New message" button 920. The messaging can be implemented in the form of e-mails, instant messages, cellular text messages, and so forth. The messaging is a closed messaging system (one direction) that is implemented through a notification sent via e-mails, instant messages, cellular text messages, and so forth. The notification indicates to the recipient that a message exists on the system, and the recipient must log-in to the system to read the message. The screenshot 900 also includes navigational buttons or links including the "Reports" button 930, "Analytics" button, "Learning Center" button, "Notifications" button, and so forth. For example, when a user clicks the "Reports" button 930, "Reports" graphical interface shown in FIG. 10 is presented. Similarly, when a user clicks the "Analytics" button, the user is provided with an analytics graphical interface shown in FIG. 11.

The screenshot 900 may also include a hyperlink or button for pulling out details of personal account or profile. In certain embodiments, the dashboard according to the screenshot 900 is the first interface that a user sees when accesses the system 700 for managing and processing complaint reports.

FIG. 10 is a screenshot 1000 of "Reports" graphical interface of a computer system according to an example embodiment. In some embodiments, the screenshot 1000 are a part of administrator interface 720. The screenshot 1000 includes a container 1010 with a list of complaint reports 1020 submitted. The list of complaint reports 1020 is typically shown in a chronological order, although other ways of listings are also possible. In some embodiments, the list of complaint reports can be sorted, by name, date filed, date updated, severity, case number, and alike. The screenshot 1000 may also include a search box and corresponding button enabling a user to run a search of a particular term, phrase or user.

Furthermore, the screenshot 1000 provides an opportunity to create a new complaint report. For these ends, the user needs to click "File New Report" button. If it is clicked, the reporting interface 710 is presented, which is further shown in FIGS. 12A-12C. Still referencing to FIG. 10, there are also provided "Dashboard" button, "Reports" button, "Analytics" button, "Learning Center" button, and "Notifications" button. Thus, the user may easily switch to any desired interface of system 700 anytime.

The Learning Center (also referred to as a Resource Center) offers content in written form (articles, papers, academic research and studies), through video and/or through podcasts. The Learning Center allows the user to find and browse by topic, type of bias, type of content, age range of content (elementary school, middle school, high school), language of content, rating of content (funny, courageous, inspiring, informative, beautiful), and by gender. Outside resources will have icons and hyperlinks to content providers' websites. Content from the Learning Center can be shared without giving access to the entire resource center. An individual who is experiencing digital threats or harassment will be provided, through the Learning Center, with information on bias, conflict resolution, effective communication, strategies for persevering and overcoming obstacles, the law and their rights with respect to defamation, consequences of digital persona, internet safety and privacy, character building, and leadership. The Learning Center offers schools concrete lesson plans, curricula, training, role play exercises, best policy, and best protocol. A list of national and local resources that students and parents can use to get immediate, professional advice is provided, including support services for students and parents in crisis (suicide, depression, self-harm, eating disorder, etc).

The Learning Center also provides digital metrics (digital communication statistics and measures of bullying, harassment and digital bullying/harassment). A user logs in and clicks on the resource center, and based on their accumulated report data through the reporting system, content and resources at the individual and community level are displayed. Users are authenticated, and content is curated for users based on their needs and interests. Users may download content, their activity is logged, and a user's rating of content is logged.

FIG. 11 are screenshots 1100 of "Analytics" graphical interface of a computer system according to an example embodiment. More specifically, the screenshots 1100 represent different portions of the same interface, which is accessible upon clicking on the "Analytics" button as mentioned above. In some embodiments, the screenshots 1100 are a part of administrator interface 720. FIG. 11 shows a timeline with a graphical representation of a number of complaints filed per day, statistical analysis of bias types associated with multiple complaint reports filed for a predetermined time period, as well as an outline of particulars of all or selected complaint reports. By default, the summary of statistical data related to all filed complaint reports is provided in the screenshots 1100, however the user may select one or more of categories. For example, the user may limit displaying of analytics and/or statistical data to specific incident location (e.g., on school property, off-site school event, off school property, on bus, digital, website, etc.). Other examples of limitations may include: specific type of participant or complainant (student aggressors, employee aggressors, unknown), specific gender (male, female), certain age or age period, certain grade, type of bias, category of incident, and so forth.

Figure 12A:
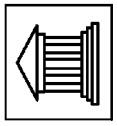

FIGS. 12A-12C are screenshots 1200 of "New Complaint Report" graphical interface of a computer system according to an example embodiment. More specifically, FIGS. 12A-12C represent different portions of the same interface, which is generally accessible upon clicking on the "File New Report" button as mentioned above. As shown in the figures, the interface 1200 include multiple fields, text field, menus, drop-down menus, check boxes, selectors, and other tools suitable for creating a complaint report. In the example shown, the "New Complaint Report" interface enables the user to select a date of incident, indicate aggressor's name and further contact details, identify complainant identity. Further, the user can indicate other persons involved into the incident, identify a type of incident (e.g., select among the types such as physical, verbal, theft, vandalism, and digital threat), identify a location where the incident happened (e.g., select from: on school property, off-site school event, off school property, on bus, and online/digital). Further, the user can identify whether or not anyone involved an immediate danger. The user can also select the nature of attack (e.g., select from: national origin, race, weight, disability, religion, gender, sexual orientation, and sexuality). In addition to above, the user can also attach an evidence in the form of a link to webpage, or the user can upload of photo, video or audio fragment. Moreover, the user can input details of incident to describe and explain what happened, explain why the attack happened, and submit any possible solution ideas. Subsequently, the user may provide a digital signature to confirm that the user agrees with predetermined terms and conditions. Once the user clicks "Submit" button, the complaint report is sent to the system 700 so as to alert an administrator and enable him to do other proceedings as described herein.

FIGS. 13A-13D are screenshots 1300 of the moderator/administrator's view of selected, filed complaint report interface of a computer system according to an example embodiment. More specifically, FIGS. 13A-13D represent different portions of the same interface, which is accessible when a user clicks on a particular complaint report shown in the container 1010 as mentioned above. As shown in the figures, the interface 1300 includes multiple containers, text boxes, and other interface elements enabling the administrator to review and manage a complaint report. For example, the interface 1300 may include time and date of incident, complainant name, safety risk for complainant (urgent, non-urgent), filing time and date, description of incident, possible reasons of incident, possible solution ideas, category of incident, location of incident, type of bias, target name, aggressors name, hyperlinks to online evidence (e.g., webpages containing an unfavorable item) and/or files (e.g., uploaded photo or video related to an unfavorable item). Furthermore, the interface 1300 may include a timeline with action logs or records related to prior events associated with the complaint report.

Notably, the administrator may identify or select or status of the evidence submitted in the complaint report. For example, when the administrator hovers a mouse cursor over a hyperlink of unfavorable item, a drop down menu 1310 appears enabling the administrator identify the evidence as explicit, restricted, and open. In some embodiments, the evidence of only "open" category will be viewable to other involved individuals (e.g., parents, guardians, officials, etc.)

Still referencing to FIGS. 13A-13D, the "New Complaint Report" graphical interface may include a container allowing the administrator to take certain actions. In some example embodiments, the administrator may save an updated complaint report (once the administrator made some edits or selections), or this process may be automated. For these ends, the administrator needs to click "Update" button 1320. Furthermore, the administrator is allowed to assign a status to complaint report, whereas the status can include "under review," "invalid," and "closed" based on the nature of complaint report, state or school provisions, and/or predetermined rules. The administrator may validate a report, and the report may thereafter be linked to a state report. The state report may include all of the validated individual reports, as well as statistical and summarizing information relating to all of the validated reports. When the administrator makes an appropriate selection, the status will be updated upon click on "Update" button 1330.

Figure 13A:
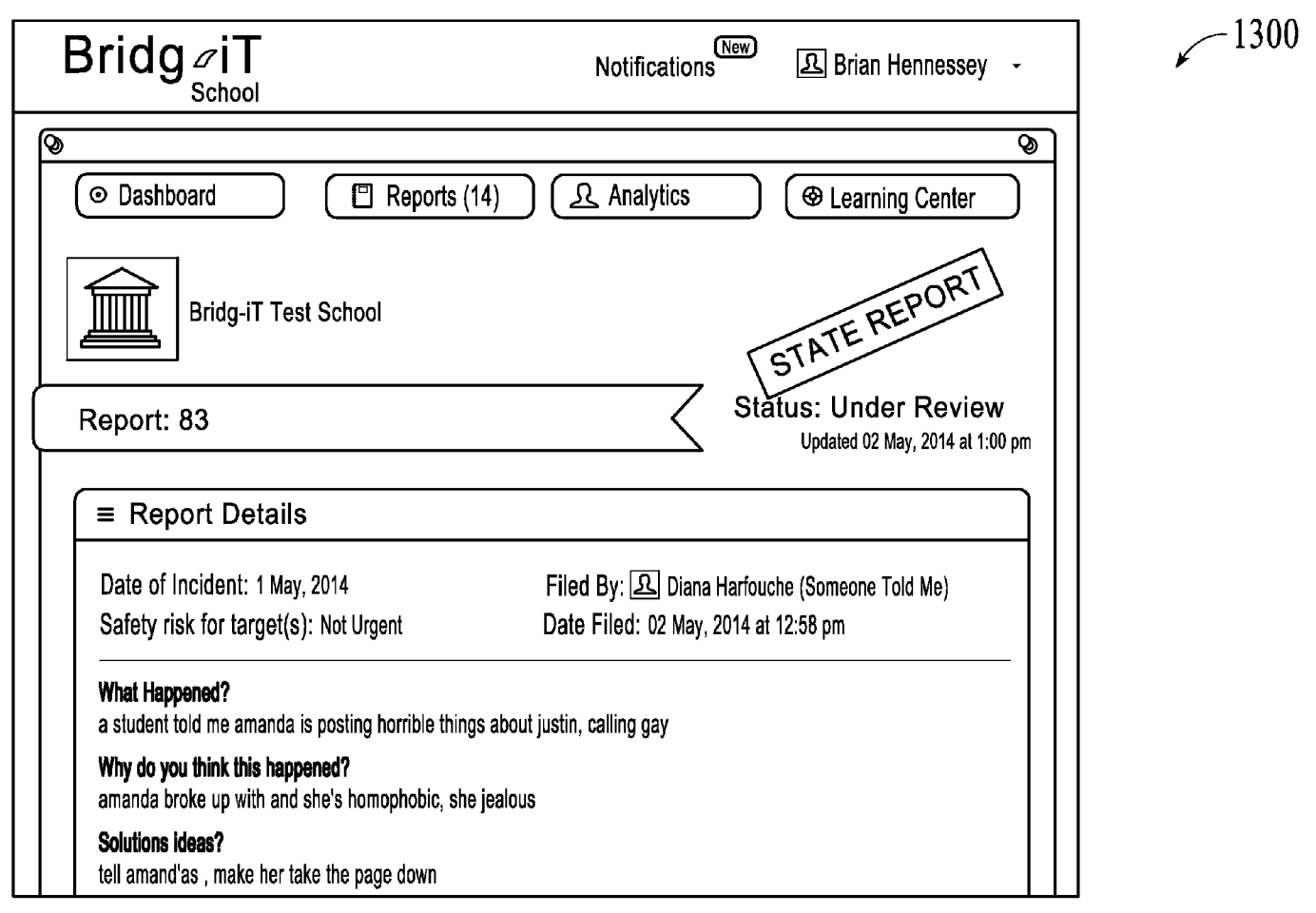
Figure 13B:
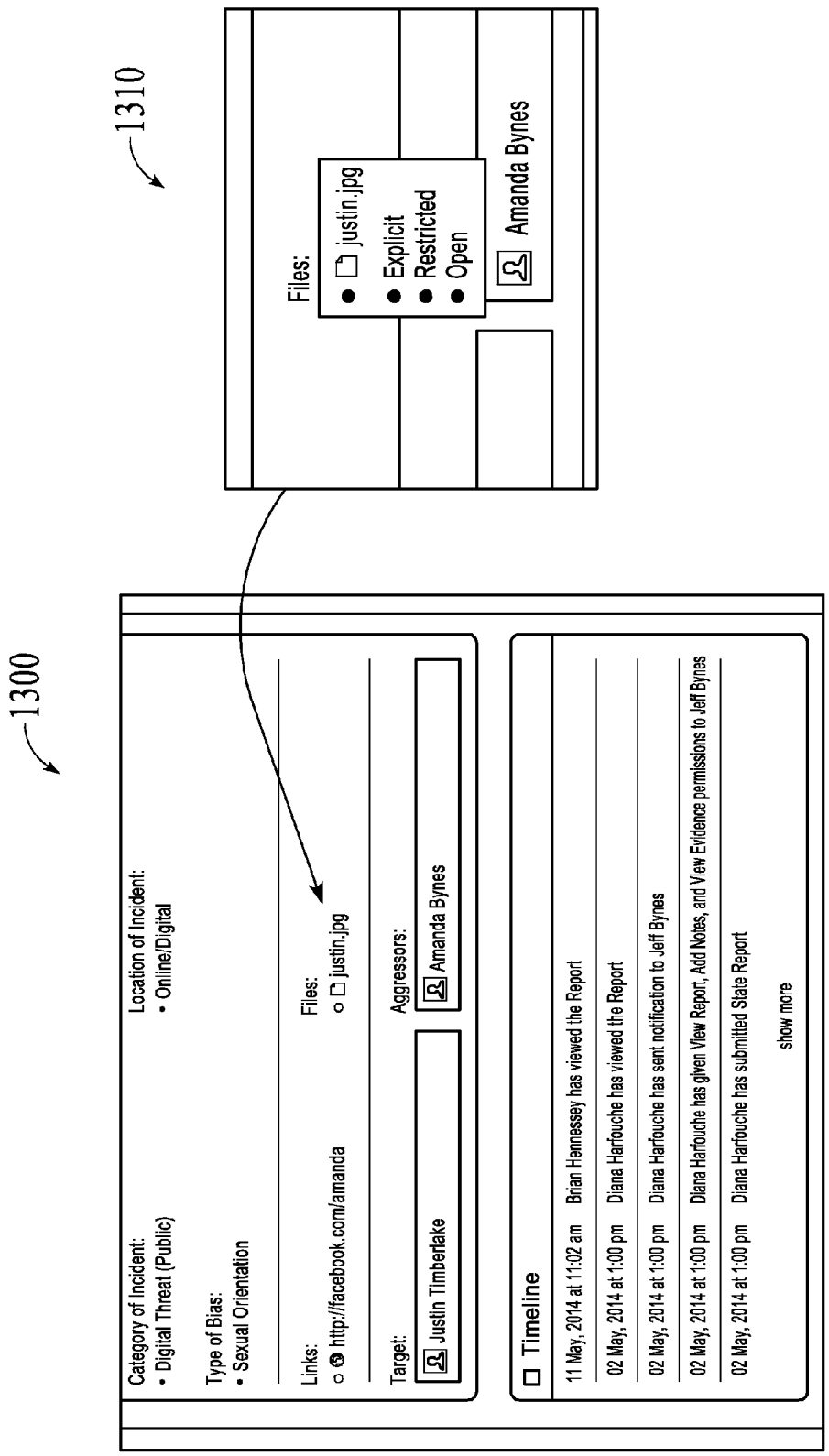
Figure 13C:
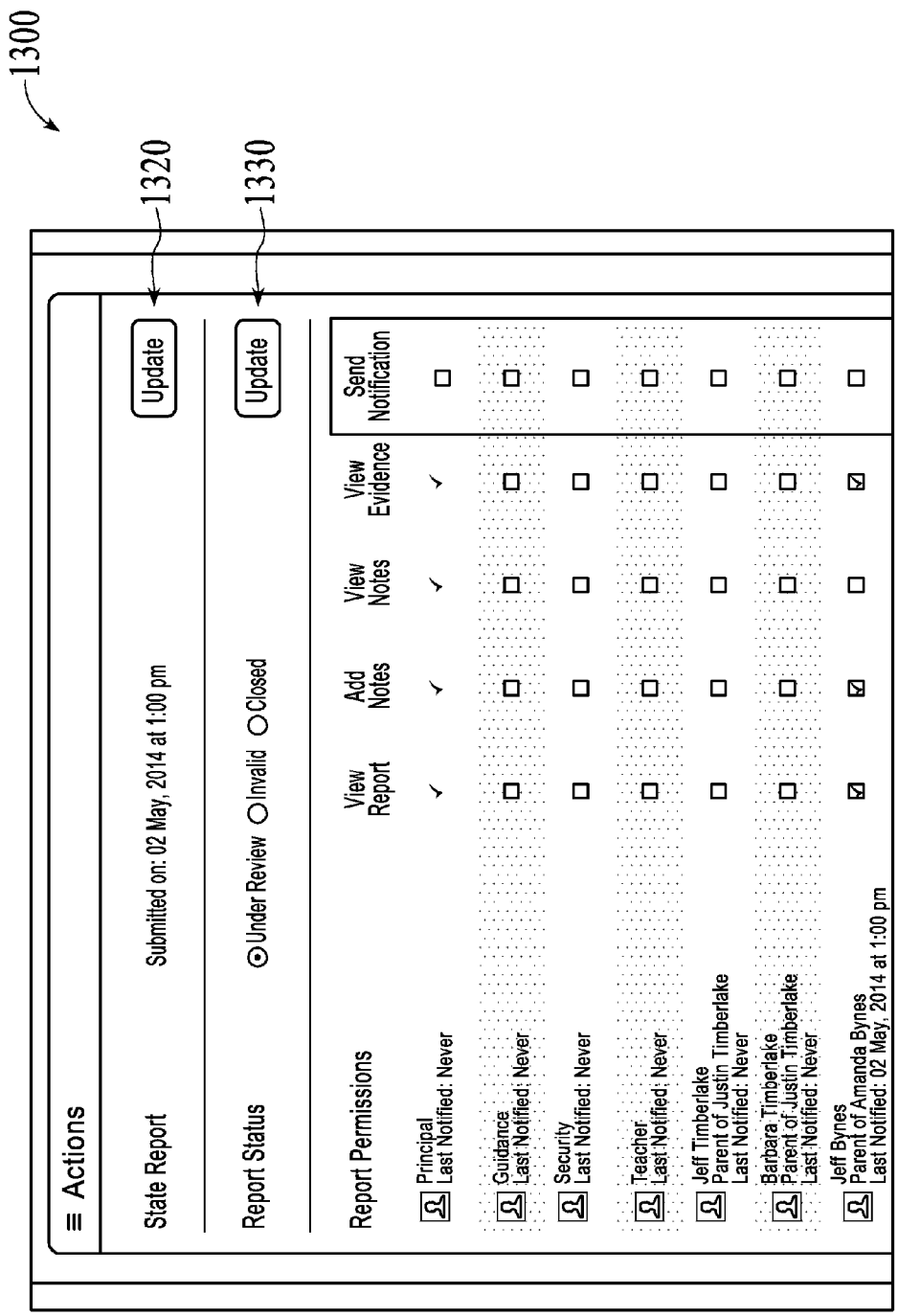
Figure 13D:
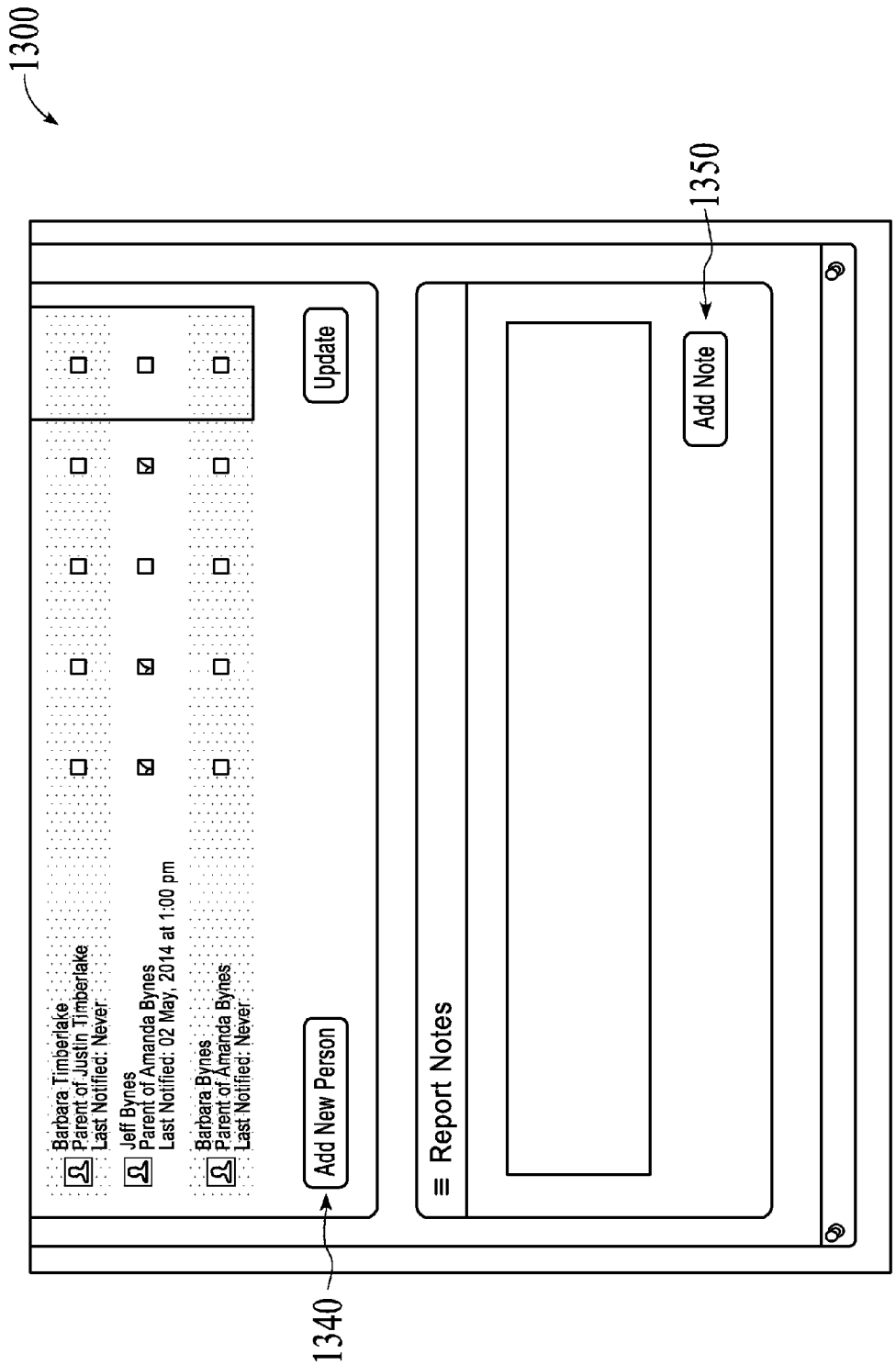
Figure 14A:
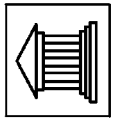

In yet more embodiments, the administrator is also allowed to select individuals who will be given access to the complaint report for viewing the report, adding notes, viewing notes, and/or viewing evidence. In addition, the administrator can select individuals who will be notified by automatic alerts or notifications. The alerts can be sent out to designated individuals every time a predetermined event happens such as when the administrator changes the status of the complaint report or adds new notes. The alerts may be in the form of emails, push notifications, instant messages, and so forth, which may be provided within the system. By maintaining the alerts and messages within the closed system, privacy may be maintained. The selection of individuals may bas simple as checking appropriate boxes as shown in FIG. 13C. The administrator can also add individuals of interest. For these ends, the administrator needs to click "Add New Person" button 1340 shown in FIG. 13D. In some embodiments, in order to add an individual to the list for alerting and reporting, the individual shall have an account or profile with the system 700.

In yet more embodiments, the administrator is also allowed to add written notes to the complaint report. For these ends, the user may input any suitable text into a text field and then click "Add Note" button 1350, both of which shown in FIG. 13D. The administrator can allow or permit other individuals to add notes to a report that show up in chronological order in the administrator's report view.

Accordingly, the selected complaint report graphical interface allows the administrator to review the complaint report and make appropriate additions or notes. The administrator can also apply a status to the complaint report, identify specific individuals who shall be notified, identify individuals who can have access to reviewing and/or editing the complaint report.

FIGS. 14A-14D are screenshots of the moderator/administrator's view, or a state-wide administrator's view, of a selected state report interface according to an example embodiment. More specifically, FIGS. 14A-14D represent different portions of the same interface, which is accessible when a user clicks on a particular complaint report having a "state report" link shown in the container 1010 as mentioned above. As shown in the figures, the interface 1400 includes multiple containers, text boxes, and other interface elements enabling the administrator or state-wide administrator to review and manage a complaint report. For example, the interface 1400 may include time and date of incident, complainant name, safety risk for complainant (urgent, non-urgent), filing time and date, description of incident, possible reasons of incident, possible solution ideas, category of incident, location of incident, type of bias, target name, aggressors name, hyperlinks to online evidence (e.g., webpages containing an unfavorable item) and/or files (e.g., uploaded photo or video related to an unfavorable item). Furthermore, the interface 1400 may include a timeline with action logs or records related to prior events associated with the complaint report.

The above description is illustrative and not restrictive. Many variations of the technology will become apparent to those of skill in the art upon review of this disclosure. The scope of the technology should, therefore, be determined not with reference to the above description, but instead should be determined with reference to the appended claims along with their full scope of equivalents.

What is claimed is:

1. A method, comprising:
   providing a reporting interface, the reporting interface adapted to generate a complaint report concerning an unfavorable item published by one or more perpetrators, the reporting interface further adapted to receive from the reporting user a bias type, a location of an incident associated with the unfavorable item, one or more names of the one or more perpetrators, and written notes associated with the unfavorable item;
   receiving the complaint report;
   relaying the complaint report to an administrator; and
   providing, by one or more processors, an administrator interface, the administrator interface adapted to display the complaint report, determine a score based on predetermined criteria, the predetermined criteria including instructions for responding to the complaint report based on the score, submit the report to an authority, and receive a report status from the administrator of the report.

2. The method of claim 1, wherein the administrator interface is further adapted to receive an identification, from the administrator, of the one or more third parties and associate the one or more third parties with the complaint report.

3. The method of claim 1, wherein the administrator interface is further adapted to receive a selection, from the administrator, of the one or more third parties for delivering notifications associated with the complaint report.

4. The method of claim 1, wherein the administrator interface is further adapted to receive at least one written note, from the administrator, regarding the complaint report.

5. The method of claim 1, wherein the administrator interface is further adapted to display to the administrator an action log associated with the complaint report.

6. The method of claim 1, wherein the administrator interface is further adapted to create and send personal messages, from the administrator, to any user in a community.

7. The method of claim 1, wherein the administrator interface is further adapted to display statistical information associated with a plurality of complaint reports.

8. The method of claim 1, wherein the administrator interface is adapted to highlight at least one new complaint report.

9. The method of claim 1, wherein the administrator interface is adapted to sort multiple complaint reports.

10. The method of claim 1, wherein the administrator interface is adapted to receive a category assignment from the administrator of a category to at least one of one or more hyperlinks and one or more attachments associated with the unfavorable item, wherein the category includes one or more of the following: an explicit category, a restricted category, and an open category.

11. The method of claim 1, wherein the report status includes one of the following: under review, invalid, valid and closed.

12. The method of claim 1, wherein the report comprises a description of the incident.

13. The method of claim 1, wherein the report comprises at least one of:
    a reporting user name; and
    one or more names of alleged perpetrators of one or more acts associated with the unfavorable item.

14. The method of claim 1, wherein the complaint report comprises one or more hyperlinks associated with the unfavorable item.

15. The method of claim 1, wherein the complaint report comprises a bias type, a category of the incident, and the location of the incident.

16. The method of claim 1, further comprising at least one of encrypting and decrypting, by the one or more processors, sensitive information associated with the complaint report.

17. The method of claim 1, further comprising alerting one or more further parties associated with the complaint report.

18. The method of claim 1, wherein the reporting interface is further adapted to receive from the reporting user a category of the incident, add one or more hyperlinks associated with the unfavorable item, and upload one or more attachments associated with the unfavorable item.

19. The method of claim 1, further comprising scoring the unfavorable item using a severity scale based on one or more of the following: the bias type, a category of the incident, the location of the incident, a perpetrator name, and responses to queries.

20. The method of claim 19, further comprising modifying the predetermined criteria based on outcome evaluations of prior complaint reports.

21. The method of claim 1, further comprising receiving and archiving the unfavorable item.

22. The method of claim 1, wherein the unfavorable item includes at least one of a picture, a video segment, a text segment, and an audio segment.

23. The method of claim 1, further comprising providing, by the one or more processors, recommendations based at least in part on the complaint report.

24. The method of claim 1, further comprising providing, by the one or more processors, resources based at least in part on report data accumulated over a period of time.

25. The method of claim 19, further comprising providing, by the one or more processors, recommendations based at least in part on the severity score.

* * * * *